Sept. 13, 1966  F. A. SOLSKI ETAL  3,271,840
AUTOMATIC MACHINING DEVICE
Filed March 19, 1963  17 Sheets-Sheet 2
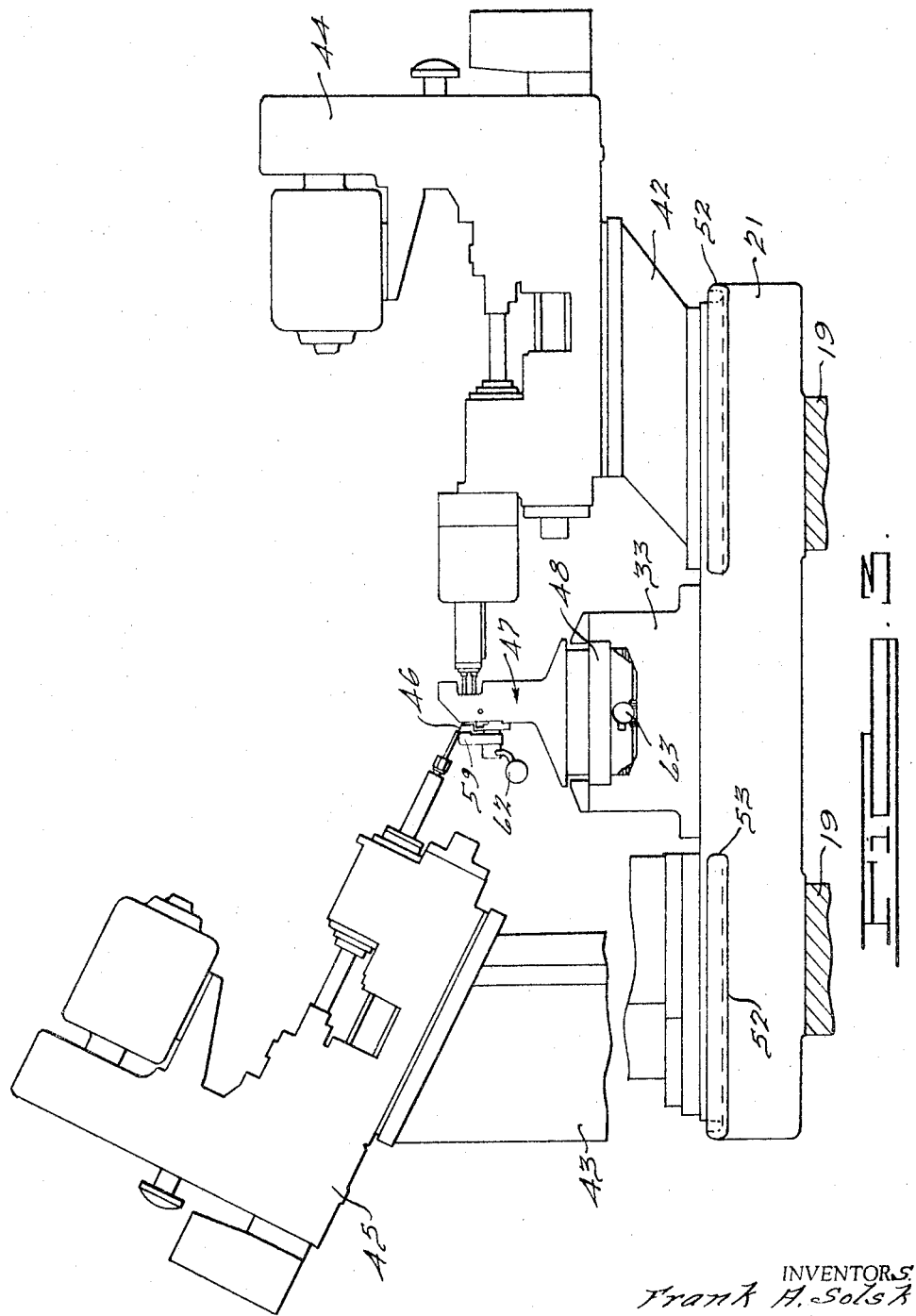
INVENTORS.
Frank A. Solski
Lyman K. Shepard
BY Harness, Dickey & Pierce
ATTORNEYS

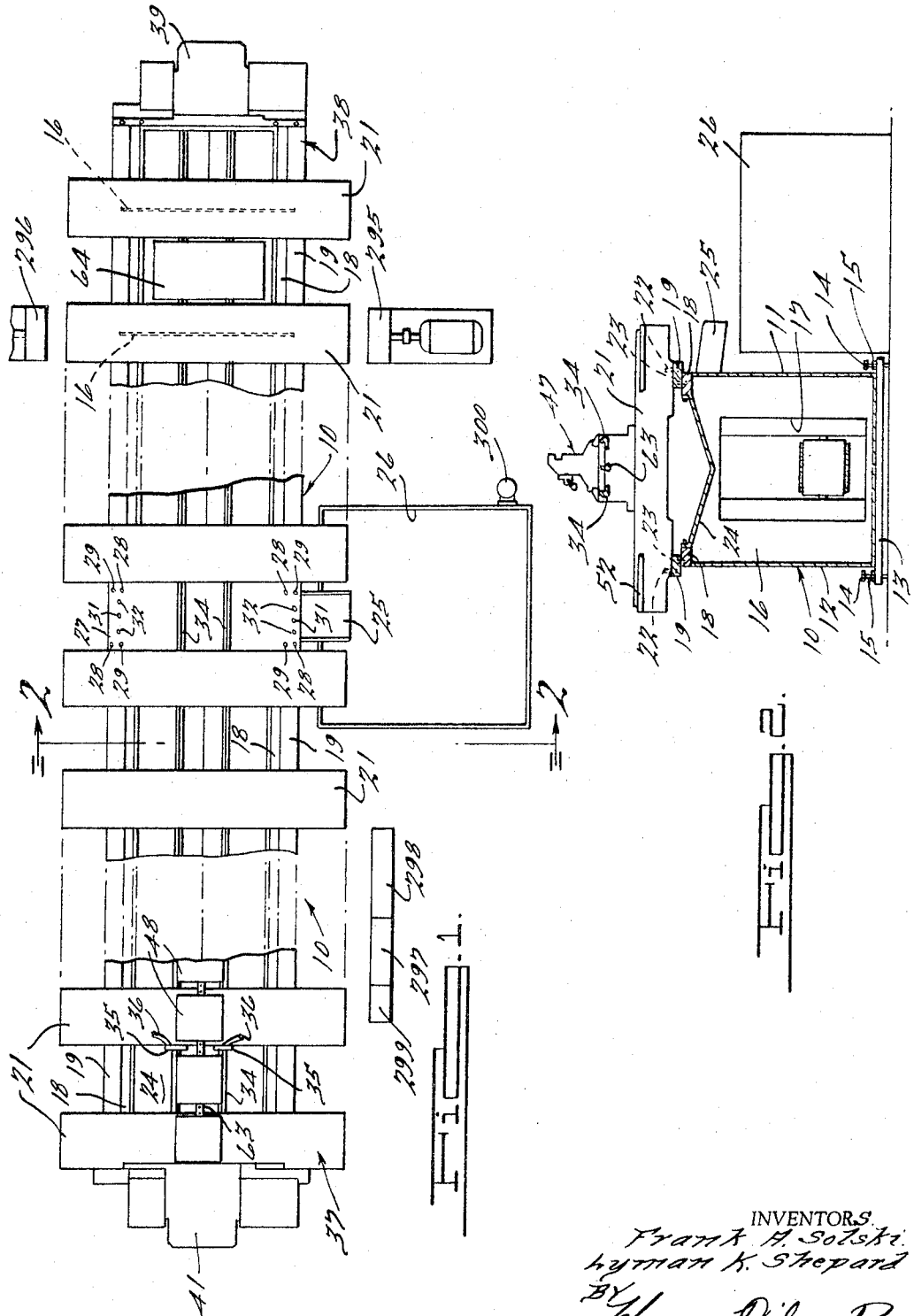

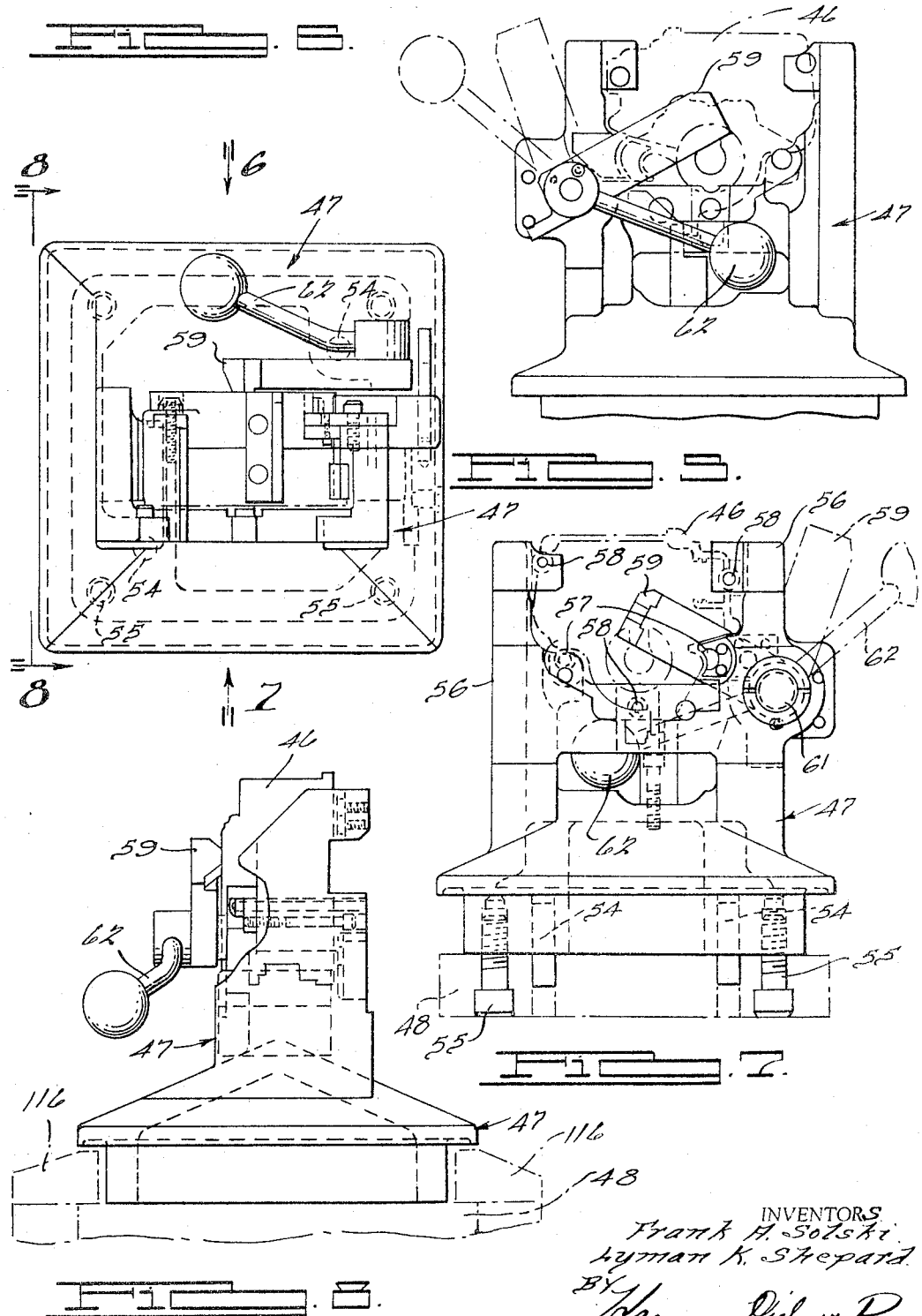

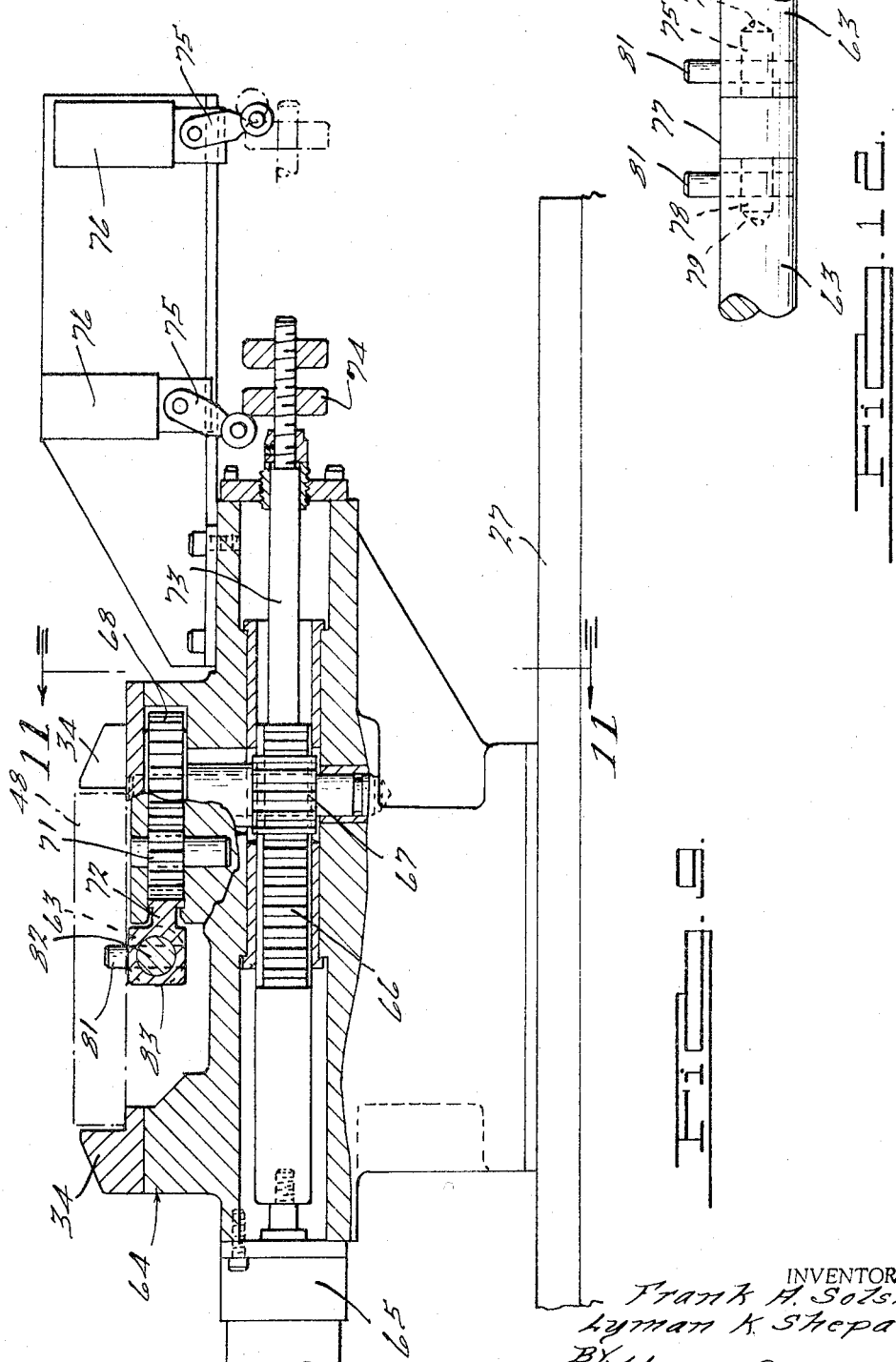

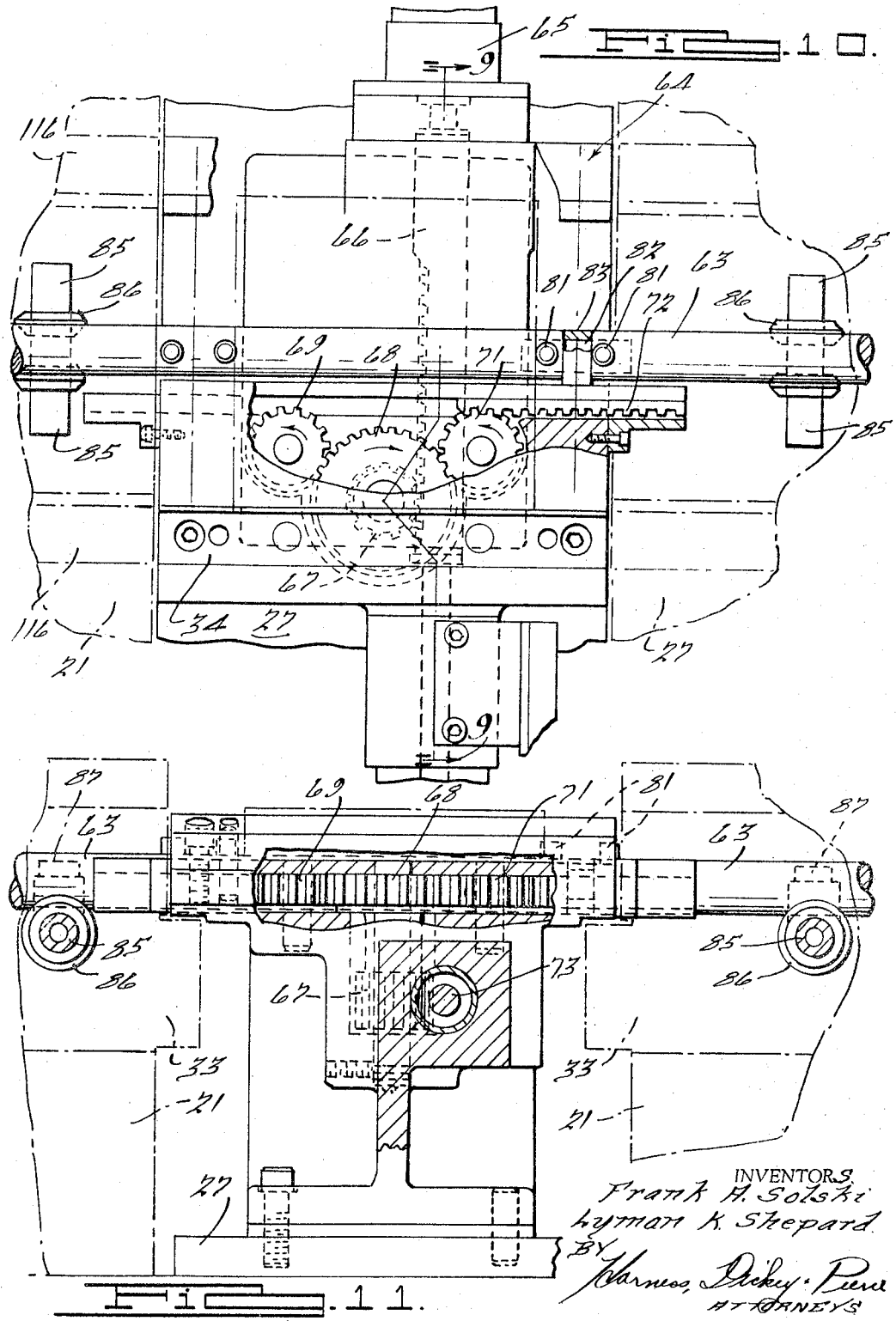

Sept. 13, 1966   F. A. SOLSKI ETAL   3,271,840
AUTOMATIC MACHINING DEVICE
Filed March 19, 1963   17 Sheets-Sheet 7

INVENTORS
Frank A. Solski
Lyman K. Shepard
BY
Barnes, Dickey & Pierce
ATTORNEYS

INVENTORS
Frank A. Solski
Lyman K. Shepard
BY
Barnes, Dickey & Pierce
ATTORNEYS

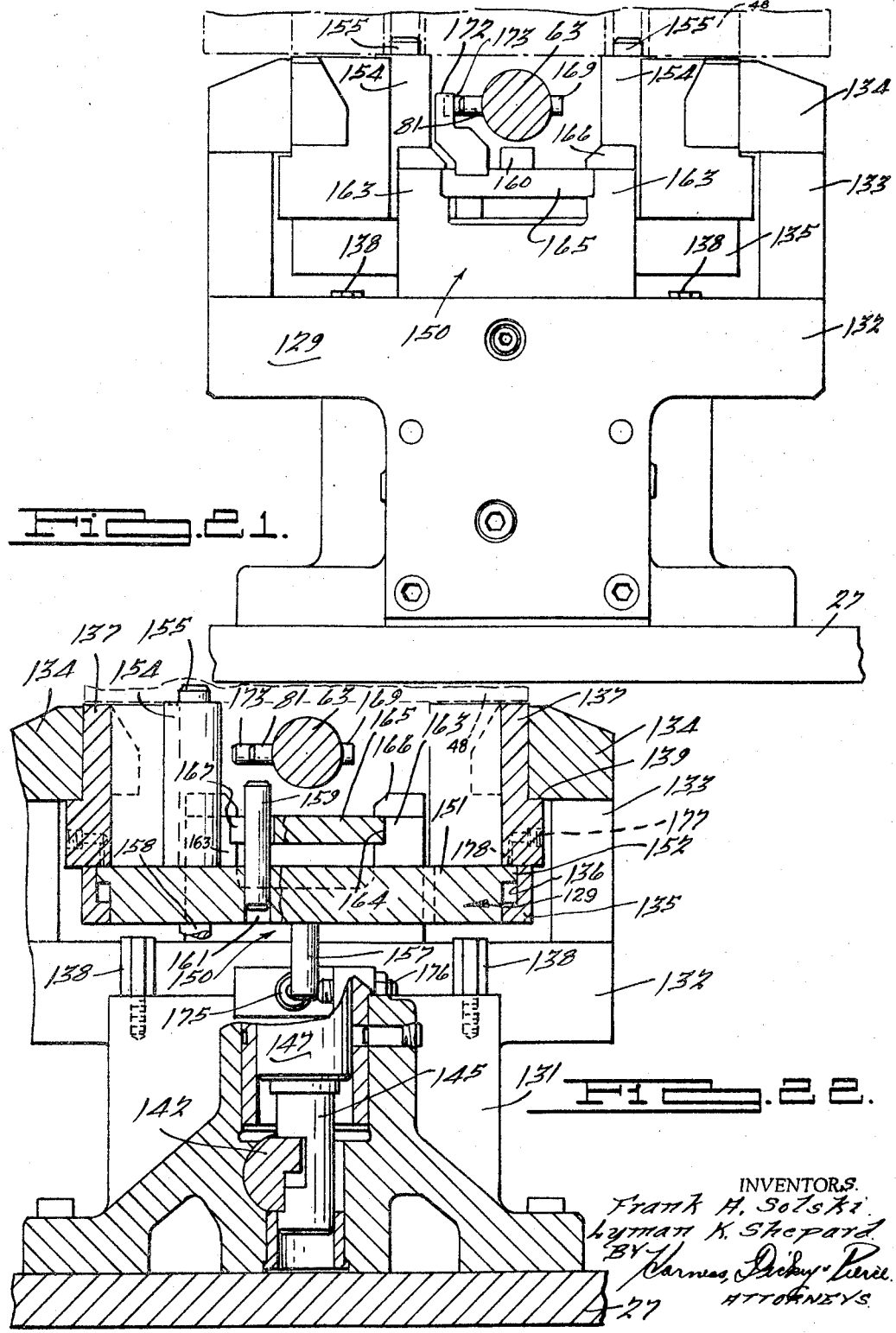

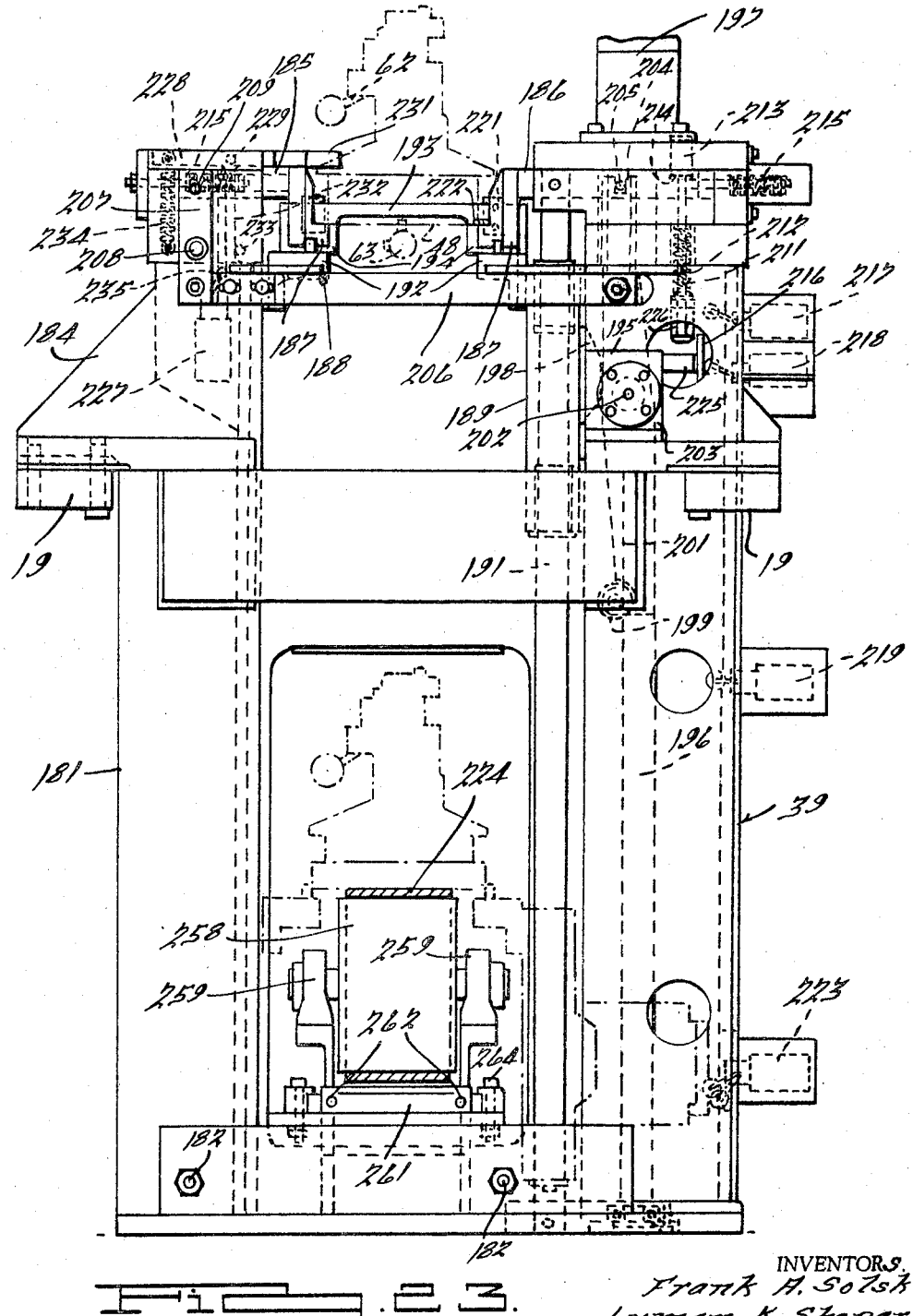

Sept. 13, 1966    F. A. SOLSKI ETAL    3,271,840
AUTOMATIC MACHINING DEVICE
Filed March 19, 1963    17 Sheets-Sheet 15
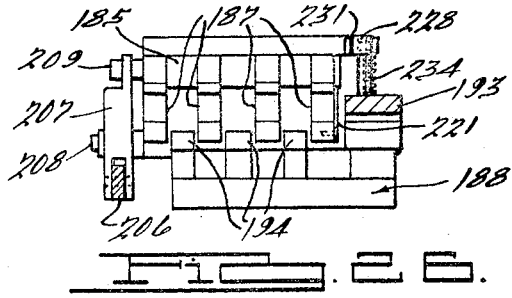
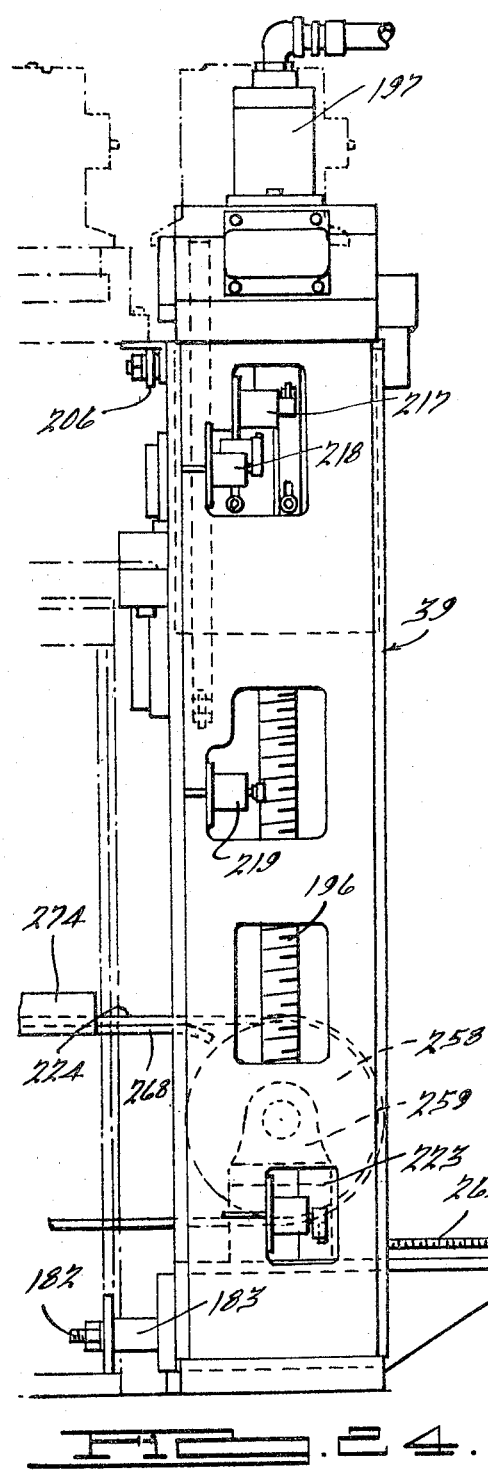
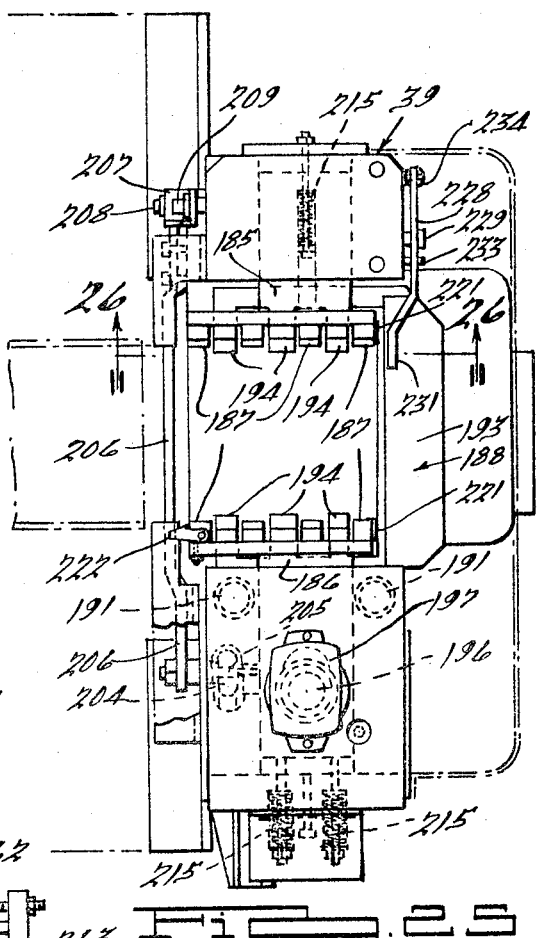
INVENTORS.
Frank A. Solski
Lyman K. Shepard
BY
Harness, Dickey & Pierce
ATTORNEYS

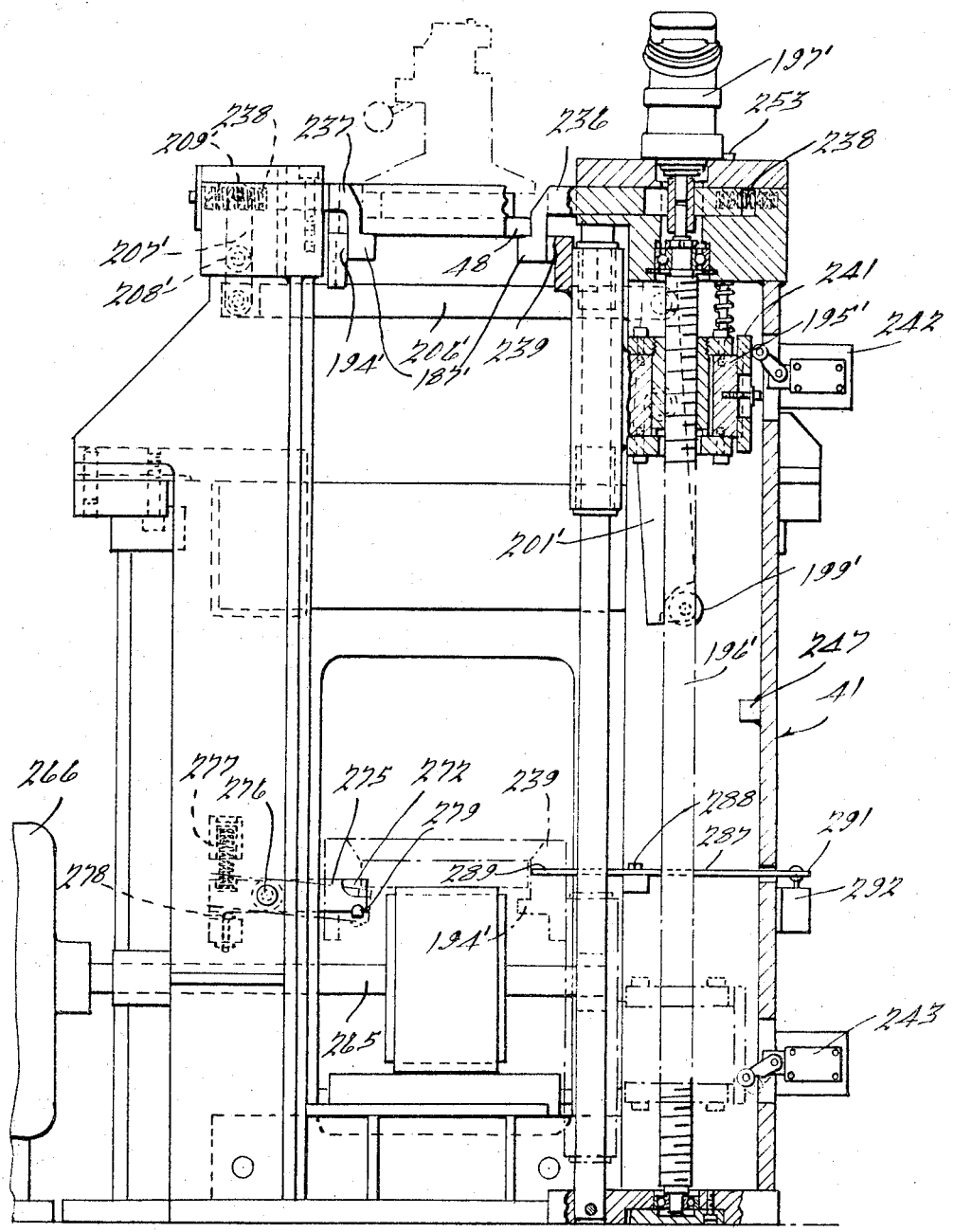

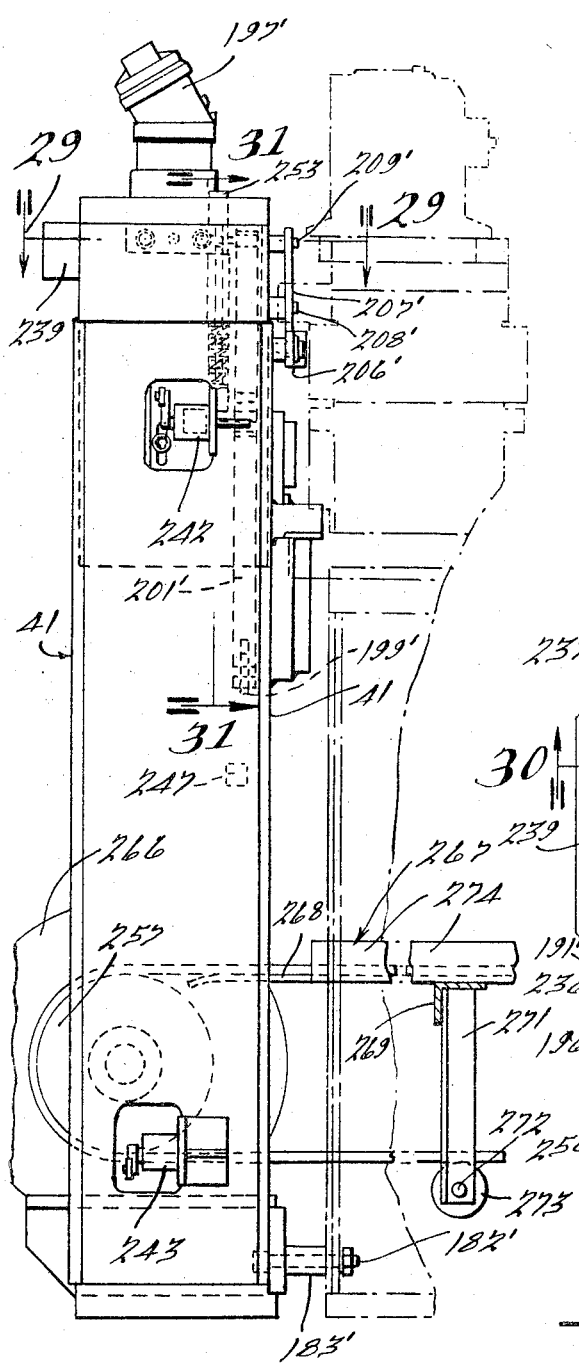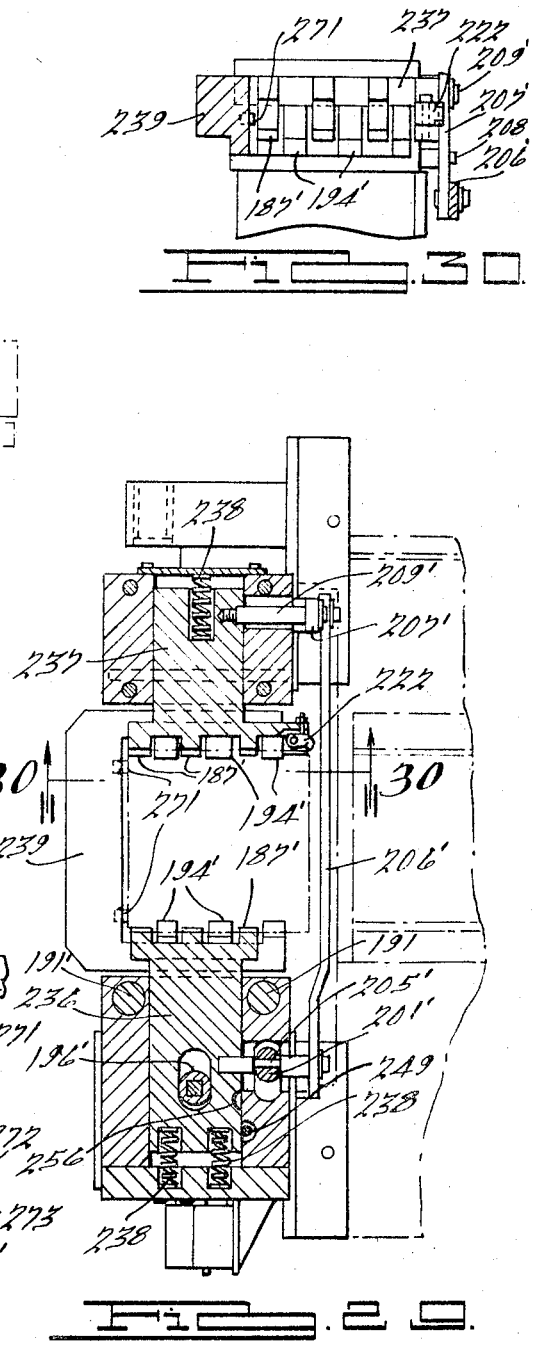

United States Patent Office 3,271,840
Patented Sept. 13, 1966

3,271,840
AUTOMATIC MACHINING DEVICE
Frank A. Solski, Bloomfield Hills, Mich., and Lyman K. Shepard, Upper Saddle River, N.J., assignors to Standard Tool & Manufacturing Company
Filed Mar. 19, 1963, Ser. No. 266,264
10 Claims. (Cl. 29—33)

This invention relates to automatic machining devices, and particularly to a machine having a large number of machining stations to which workpieces are advanced as a group on supporting pallets which are returned from the rear to the forward end of the machine.

The machine is made up in sections each embodying a base section having spaced machining stations containing locating and clamping mechanism for a pallet which carries a fixture for locking a workpiece therein. The base sections are connected together to form an extended line of any desired length, with rails at each edge across which bridging members are disposed and accurately spaced relative to each other. In the present arrangement, by way of example, the bridging members are disposed twenty inches apart for increment advancement of ten inches which locates a pallet in and between the bridging members. Other devices, such as those for rotating the pallet and the like, are mounted between the bridging members on bridging plates similar to those used for connecting the joined ends of the base sections.

A V-shaped trough is supported near the top of the base sections, and the bridging members have coolant collecting troughs about the ends and sides which deliver the used coolant to the troughs. At the junction between the base sections, a drain spout directs the coolant to a tank having a motor and pump from which the coolant is circulated to each of the machine devices.

The machine devices are mounted on the bridging members on one or both ends thereof on slides which advance the tool to the work which is driven in rotation and further advanced to perform the machine operation. Such machine operations may be drilling, countersinking, face milling, tapping, reaming and the like which are well known to be suitable for such machine devices. At each of the bridging members the workpiece is stopped and accurately located so that the work performing operation can take place. A plurality of pallets are employed which are approximately eight inches square and which are carried on trackways from one end of the machine to the other. Each station at the bridging members has a trackway and mechanism for accurately locating the pallet and clamping it against corner surfaces of the overhanging rail portions. Air is delivered to an aperture through the corner surfaces which is shut off when the surfaces are engaged by the top corners of the pallet. The top edges of the pallet may be cleaned at the forward, any or all of the stations by a wiper element above each rail, employed alone or with a flow of coolant delivered to the vicinity of the wiper elements. The wipers provide assurance that a positive engagement will occur between the surfaces at the corner of the pallet and the four corner sections with which it engages when in located clamped position. The air through the apertures at the corners is cut off when the pallet is properly located and an indication is given that the work is in correct position for machining.

A reciprocal bar is provided centrally below the pallets having a pair of pins for each pallet located at the forward and rearward edges thereof. The bar may be rotated through 90° to have the pins disposed in a horizontal or in a vertical plane. When the pins are in a horizontal plane, the bar may be retracted out of engagement with all of the pallets and thereafter, when rotated into a vertical plane, the pins will be disposed at either end of the pallet so that when the bar is again advanced, all of the pallets will be advanced the increment specified which, for the example mentioned above, is ten inches. At the end of the advanced stroke, servomechanisms are operated for providing a supply of fluid to the raising, locating and clamping device for the pallets and the ram for the reciprocable bar which is again rotated to have the pins disposed in a horizontal plane and returned to initial position. Thereupon, all of the machining devices advance to engage work with the tool which is rotated and advanced to perform the machining operation.

At certain points between the bridging members, a rotating device is provided which raises the pallet from the rails and rotates it through 90° by the engagement of an extension on one of the pins with an extension on a slide which rotates a disk which supports the raised pallet. Thereafter, the supporting disk is lowered and the pallet is returned to the rails with the work located 90° from its initial position. The turned pallet and workpiece are thereafter advanced into the locating and clamping device on the next adjacent bridging member to have a machine operation performed thereon. At the next or some subsequent station between a pair of bridging bars, a similar rotating device is provided which will rotate the pallet back to its initial position so as to be delivered from the machine in the same position it was in when advanced into the machine. Any number of the rotating devices may be employed, each one rotating the pallet 90° so that any position 90° from the initial position may be presented to the machine devices for a machining operation.

At the forward end of the machine, a lifting device is provided for receiving and raising a pallet so that it may be advanced onto the rails and through the machine. At the rear end of the machine, an unloading station is provided where the finished workpiece is removed and the new workpiece is clamped in the supporting fixture. Thereupon, the pallet is advanced into an elevator which lowers the pallet onto a belt disposed within the base sections which carry the pallets to the forward end of the machine into the lifting elevator. With this arrangement, it is only necessary for a single operator to remove the finished workpiece and place a new workpiece in the fixture just prior to the time the fixture is advanced into the lowering elevator, placed on the conveyor belt and carried to the forward portion of the machine. Since the four corners of the pallet are sensed for location when in clamped position, and since similar air gauging apertures are provided in the rotating device for the pallets, all of these operations must be performed before a complete shut off of the air will occur and before the machine operations can take place. As soon as pressure builds up in the air system, knowledge is had that all of the ports are completely covered and a signal is given which initiates the machining operation.

Accordingly, the main objects of the invention are: to provide a machine in which a workpiece is advanced from one station to another and accurately located prior to the time a machine operation is performed thereon; to provide a machine in which pallets advance workpieces seriatim from work station to work station in accurate increments where they are accurately located and clamped before a machine operation is performed at the stations; to provide a machine having a plurality of pallets thereon which are advanced to stations seriatim as a group, with the rearmost pallet lowered onto a conveyor belt which carries it to the forward end of the machine where the most advanced pallet on the belt is raised and advanced into the forward end of the machine; to provde a machine in which a multiplicity of operations occurs simultaneously after indications have been provided that all of the workpieces are accurately located ready to be machined, and, in general, to provide a machine for performing a multiplicity of operations which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken plan view of a machine embodying features of the present invention, without the machine devices illustrated thereon;

FIG. 2 is a sectional view of the machine illustrated in FIG. 1, taken on the line 2—2 thereof;

FIG. 3 is an enlarged broken view of the upper portion of the machine illustrated in FIG. 2, with machine devices shown thereon;

FIG. 5 is an enlarged left-hand view of the clamping fixture employed with the devices illustrated in FIGS. 3 and 4;

FIG. 6 is a left-hand view of the fixture illustrated in FIG. 5, as positioned in FIGS. 3 and 4;

FIG. 7 is a right-hand view of the fixture illustrated in FIG. 5;

FIG. 8 is a view of the fixture illustrated in position of FIGS. 3 and 4;

FIG. 9 is a sectional view of the device for reciprocating the advanceable bar, taken on the line 9—9 of FIG. 10;

FIG. 10 is a plan view of the mechanism for reciprocating the advanceable bar of the machine;

FIG. 11 is a sectional view of the structure illustrated in FIG. 9; taken on the line 11—11 thereof;

FIG. 12 is a broken view of the connecting element for the sections of the advanceable bar;

FIG. 21 is a sectional view of the structure illustrated in FIG. 18, taken on the line 21—21 thereof;

FIG. 22 is a sectional view of the structure illustrated in FIG. 19, taken on the line 22—22 thereof;

FIG. 23 is a view in elevation of a lowering device shown at the right-hand end of the machine illustrated in FIG. 1;

FIG. 24 is a right-hand view in elevation of the structure illustrated in FIG. 23;

FIG. 25 is a plan view of the structure illustrated in FIG. 23;

FIG. 26 is a sectional view of the structure illustrated in FIG. 25, taken on the line 26—26 thereof;

FIG. 27 is a view, partly in section, of the lifting device illustrated at the left-hand end of the machine illustrated in FIG. 1;

FIG. 28 is a broken view in elevation of the right-hand side of the lifting device of FIG. 27;

FIG. 29 is a sectional view of the structure illustrated in FIG. 28, taken on the line 29—29 thereof;

FIG. 30 is a sectional view of the structure illustrated in FIG. 29, taken on the line 30—30 thereof, and FIG. 31 is a broken sectional view of the device illustrated in FIG. 28, taken on the line 31—31 thereof.

Figure 4:
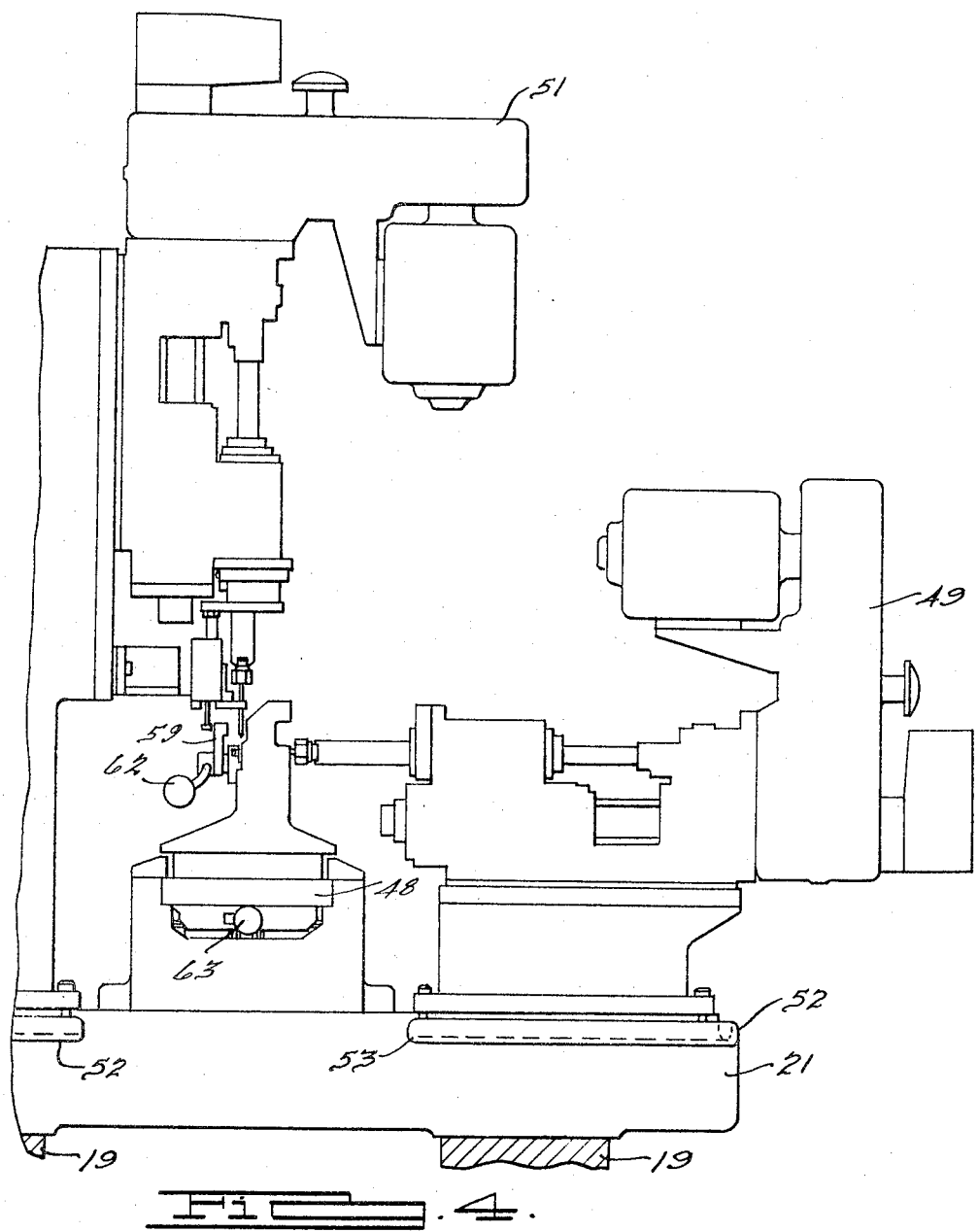
FIG. 4 is a view of structure, similar to that illustrated in FIG. 3, showing other forms of machine devices.

The present machine is made from basic units, any number of which may be employed to construct a machine of such length that the desired machine operations can be performed. A base is made from a number of like sections constructed of side, end and intermediate plates. Rail members are supported at the top side edges of each section across which supporting bars are secured at predetermined increment spaced relation.

Referring to FIGS. 1 and 2, base elements 10 are made up as units which are disposed in aligned relation to provide any desired length to the machine. Each base element, as herein illustrated, is made from side plates 11 and 12 interconnected at the bottom by a plurality of spaced bars 13 some of which have leveling screws 14 with locking nuts 15 thereon, other of which have holes therein for lag screws for securing the base elements to the floor. Partitions 16 are welded to the side plates 11 and 12 and also to the base strips 13 with which they are aligned to close the ends and to provide spacers interjacent thereof. Each of the partitions 16 has a central aperture 17 therethrough for a purpose which will be explained hereinafter. At the top edge of the side plates 11 and 12 and the ends of the partitions 16, strengthening rails 18 are welded to form supports for rails 19 across which a plurality of bridge members 21 are secured. The rails are accurately located by dowels 22 which also locate the bridge members thereon, all of which are secured together by bolts 23.

A trough 24 is welded to the inner faces of the rails 18 of each base section. An outlet spout 25 is disposed between the adjacent ends of the base sections and overlaps the ends of the troughs 24, to which it is secured by bolts which clamp a gasket between each overlapped edge. The coolant from the various work stages is gathered in the trough 24 and is delivered by the outlet spout 25 to a tank 26.

The two ends of base sections are joined together by a plate 27 which forms a standard base for supporting devices at the joint or any point between the bridge members. The plate is located on the rails by dowels 28 and is secured thereto by screws 29. Additional dowels and threaded apertures can be provided in the plate to locate and support other devices which may be mounted thereon.

The bridge members 21 are spaced in predetermined relation to each other and may be disposed directly adjacent to each other or, as herein illustrated, are spaced apart substantially twice the distance so as to be on unit centers, for example, 20-inch centers, whereas, if desired, they could be placed on 10-inch centers when disposed directly adjacent to each other.

In the arrangement herein illustrated, a pallet locating and clamping mechanism 33 is mounted on each of the bridge members 21. Each mechanism has spaced guide rails for a pallet which are joined by guide rails 34 disposed in extension thereof to permit the pallet to pass from one mechanism to the other. When the bridge members are directly adjacent to each other, the pallet can move from one mechanism 33 directly to the other without the employment of the intermediate rails 34. As the pallets are advanced on the rails 34 from one mechanism 33 to the other, wiping elements 35 contact the edges of the pallet which are washed by a coolant delivered thereto through conduits 36. This makes certain that the top surfaces at the edges of the pallet are free of any dirt or grime when raised to clamped position.

As illustrated in FIG. 1, the work passes from the left-hand end 37 of the machine to the right-hand end 38 thereof. The pallets pass into an elevator mechanism 39 which lowers the pallet onto a belt which returns the pallet to the front end of the machine where it is raised by an elevator 41 and advanced into the machine to start a new operation. The finished workpiece is removed at the endmost station at the rear end 38 of the machine and a new workpiece is clamped into the fixture before entering the lowering elevator.

In FIGS. 3 and 4, the pallet locating and clamping mechanism 33 is illustrated as being mounted centrally on the bridge element 21, with work performing devices 42 and 43 supported outwardly thereof on the bridge members 21. The work performing devices 44 and 45 are herein illustrated as being drilling machines for drilling holes in a workpiece 46 which is clamped within a fixture 47 secured to a pallet 48 which is advanced through the machine. FIG. 4 shows a similar construction, that wherein work performing devices 49 and 51 perform additional drilling operations on the workpiece 46 at an advanced station. It will be noted in FIGS. 3 and 4 that the bridge members 21 have coolant collecting troughs 52 at each end thereof in which the coolant from the devices 44, 45, 49 and 51 is collected and distributed from the inner open ends 53 to the trough 24.

Referring to FIGS. 6 to 8 inclusive, the fixture 47 is located by dowels 54 on the pallet 48 and secured thereto by screws 55. The workpiece 46 is located between vertically extending walls 56 and positioned by the locating elements 57 and by the buttons 58. The workpiece is secured in position by a clamping arm 59 supported on a screw 61 which is rotated by an operating arm 62. The workpiece 46 is accurately located and clamped in the fixture 47, with all of the areas, in which an operation is to be performed, exposed for receiving the tool located at a station where the specific operation is to be performed.

The pallets are advanced from the pallet locating and clamping mechanism 33 onto the rails 34 therebetween in increments of exactly ten inches of movement for the arrangement herein illustrated, with the pallet locating and clamping mechanism disposed on 20-inch centers. The movement is produced by an advancing bar 63 which is moved longitudinally by a device 64, as illustrated more specifically in FIGS. 9, 10 and 11. The device 64 includes a ram 65 which advances a rack 66 to operate a pinion 67 to rotate a gear 68 which rotates a pair of pinions 69 and 71 for driving a rack 72 which is secured to the advancing bar 63. The rack 72 is of reduced length since the employment of the pair of pinions 69, 71 permits the rack to pass from one pinion to the other in either direction of operation since the pinions are maintained in timed relation by the gear 68. The end of the rack 66 has an extending rod 73 which has adjustable nuts 74 thereon by which arms 75 of indicating switches 76 or other sensing devices are operated for sequencing other operations of the machine at each end of the stroke of the rack 72 and the advancing bar 63. The bars 63 may be of various lengths so long as they are increments of ten inches, for the example herein illustrated.

Figure 13:
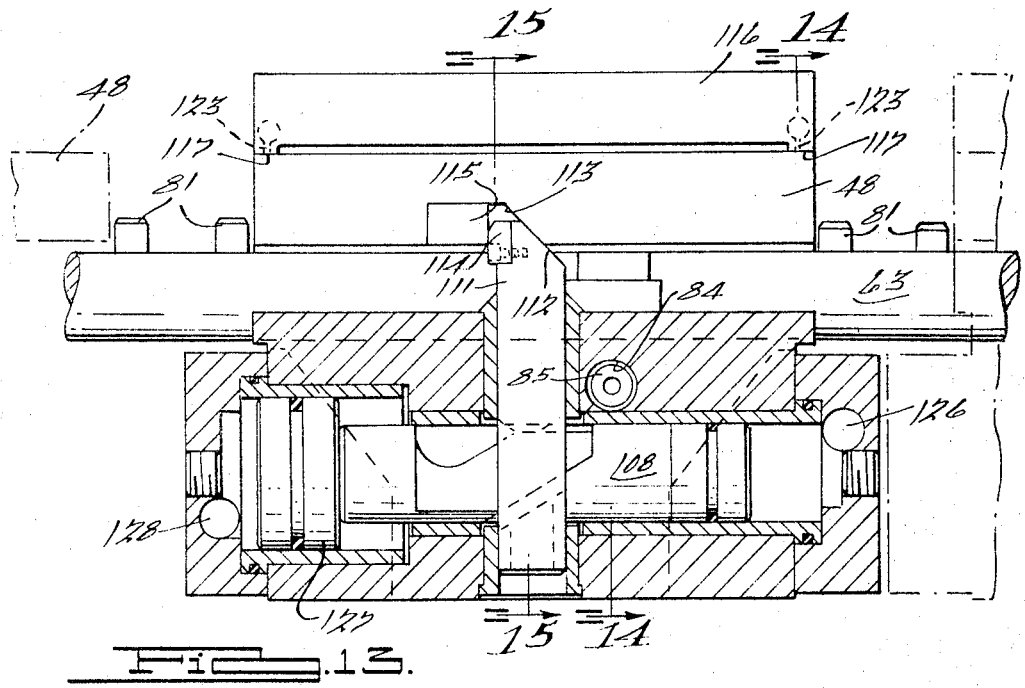
FIG. 13 is a sectional view of mechanism for positioning and clamping a pallet.
Figure 14:
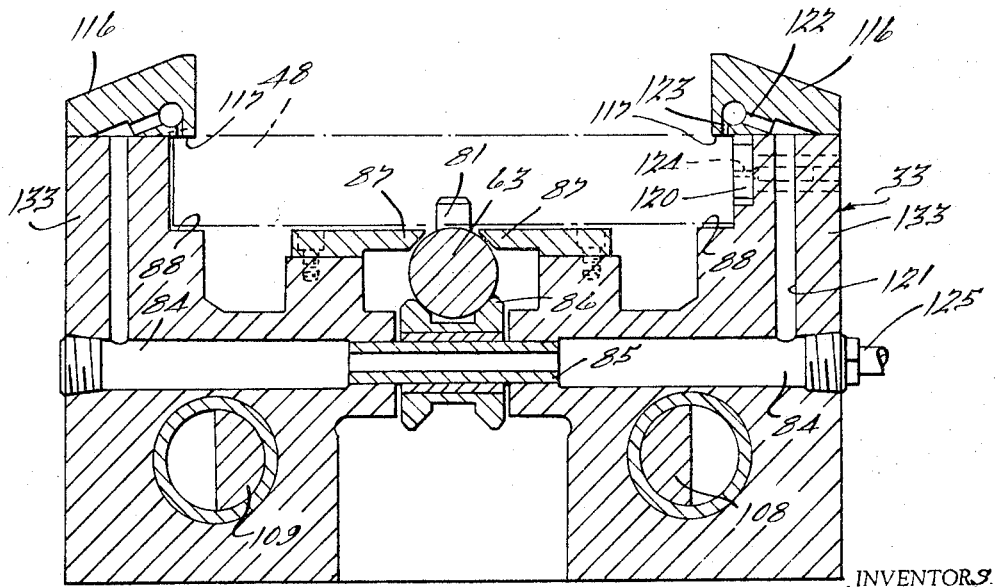
FIG. 14 is a sectional view of the structure illustrated in FIG. 13, taken on the line 14—14 thereof.
Figure 15:
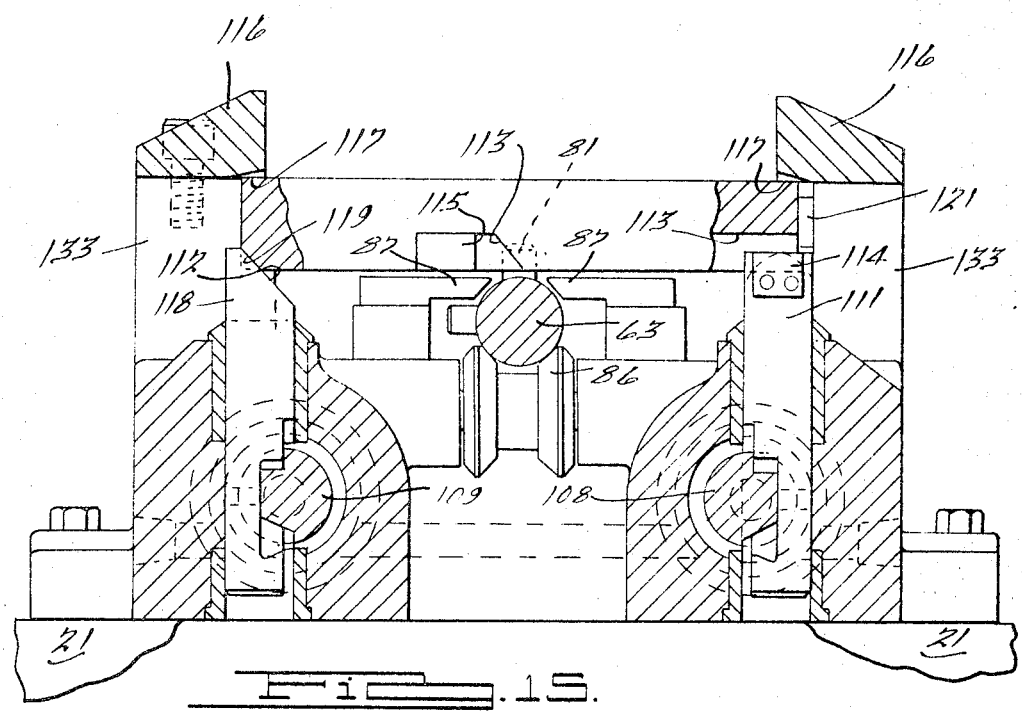
FIG. 15 is a sectional view of the structure illustrated in FIG. 13, taken on the line 15—15 thereof.

As illustrated in FIG. 12, the bar is joined together by a connecting element 67 which has a diameter equal to that of the rod and which has two projecting fingers 78 of reduced diameter which extend within apertures 79 in the ends of the rods where they are secured by projecting positioning pins 81. In the arrangement illustrated in FIG. 9, the connecting element 77 is omitted and a pin 82 substituted therefor which passes through an aperture in a boss 83 on the rack 72, the pins being secured in position by the positioning pins 81 for retaining the rack 72 between the adjacent ends of the advancing bars 63. As illustrated in FIGS. 13, 14 and 15, the pallet locating and clamping mechanism 33 has air passages 84 disposed in aligned relation from opposite sides of the mechanism between the inner ends of which a hollow shaft 85 is press-fitted for supporting a roller 86 on which the advancing bar 63 is supported. Adjacently disposed fingers 87 extend over the bar 63 and prevent it from moving upwardly any substantial amount from the supporting roller 86. Shoulders 88 are provided on opposite side portions of the mechanism adjacent to the top to form guideways on which the pallet 48 is advanced to a station or to a space between the stations in the particular machine herein illustrated.

Figure 16:
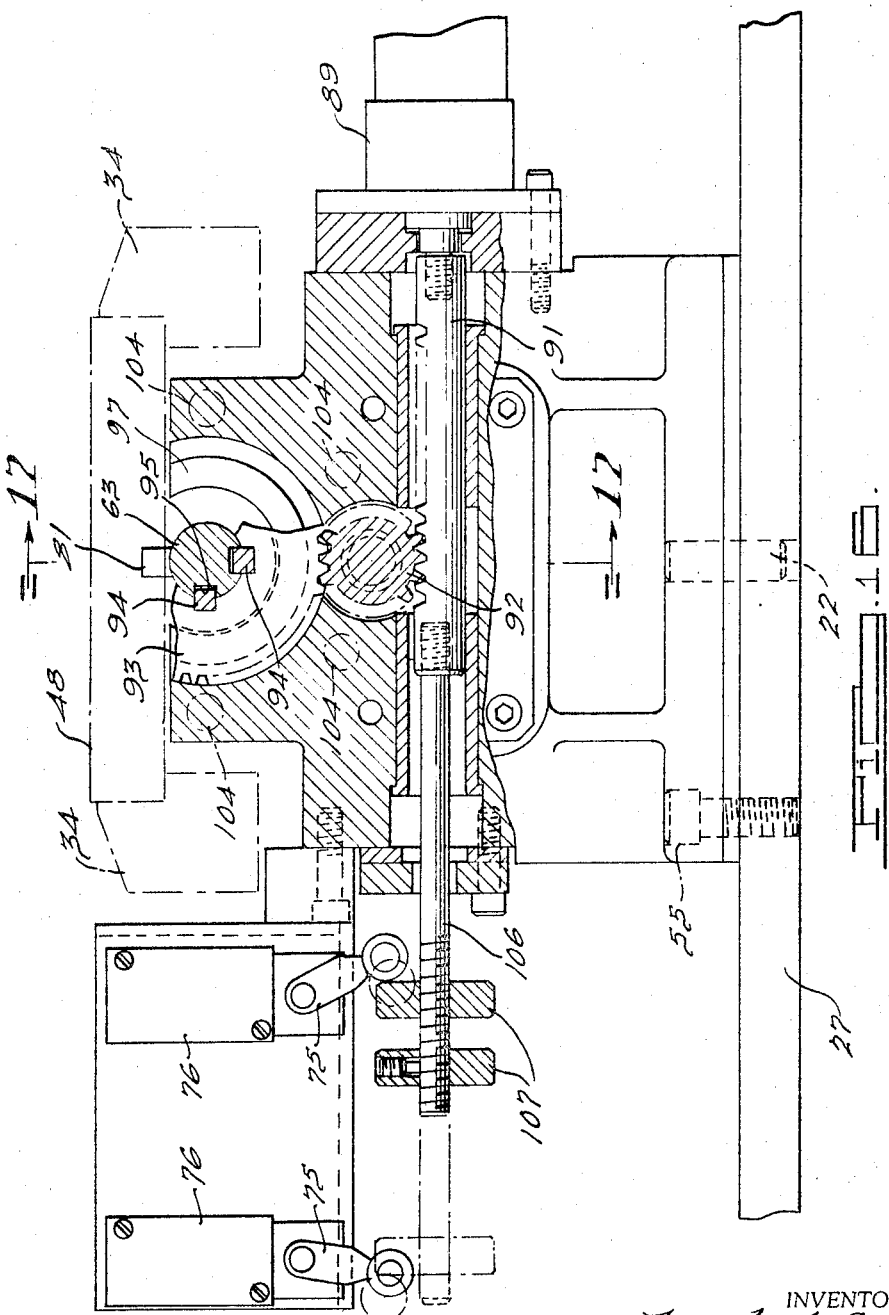
FIG. 16 is a sectional view of mechanism for rotating the advanceable bar through 90° clockwise and counter-clockwise.
Figure 17:
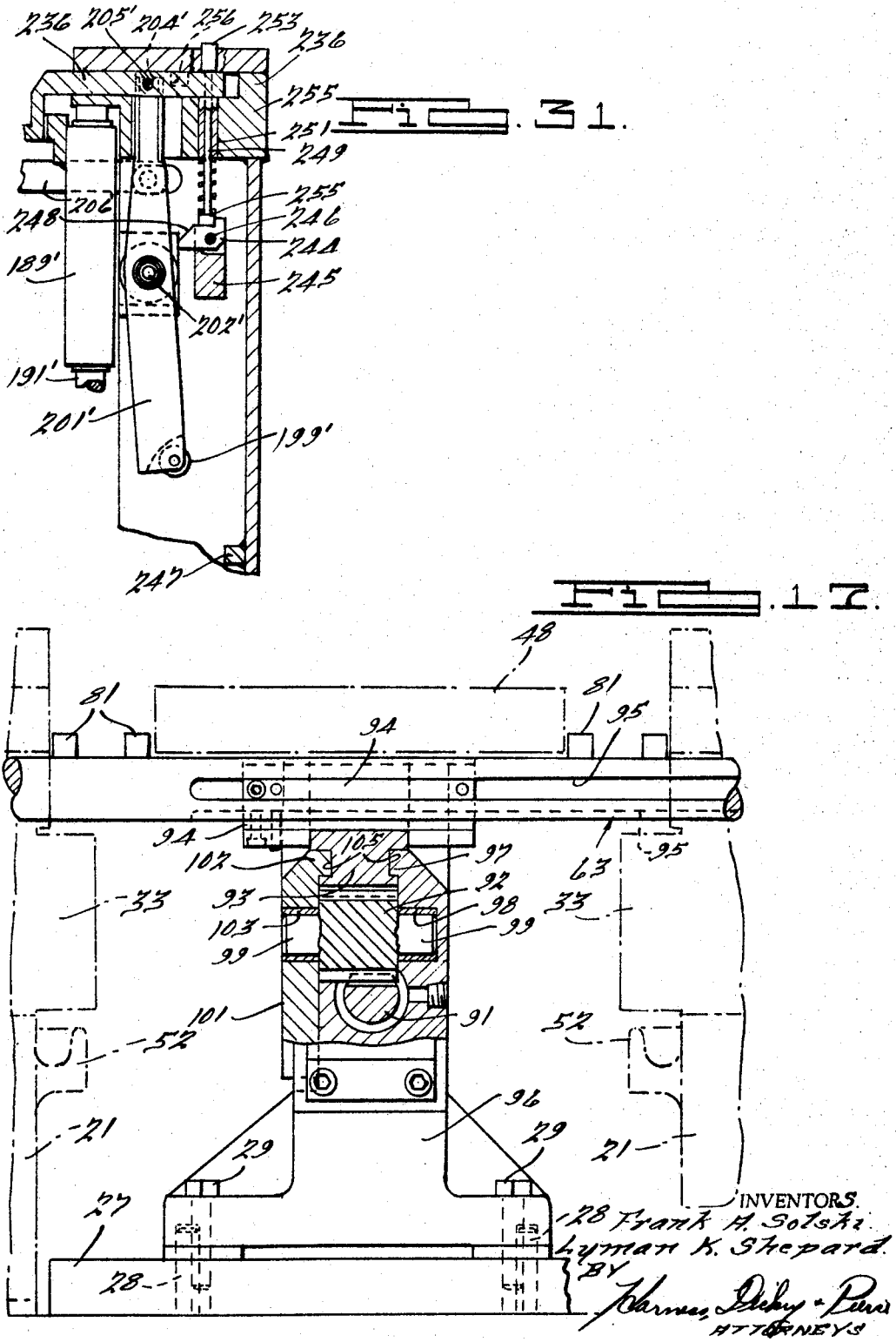
FIG. 17 is a sectional view of the structure illustrated in FIG. 16, taken on the line 17—17 thereof.

As illustrated more specifically in FIG. 13, the pins 81 are disposed in the space between the pallets 48 to have a pin at each end thereof. When the advancing bar is rotated to have the pins disposed vertically, the longitudinal movement of the bar by the mechanism 64 advances all of the pallets an amount equal to the increment of the machine which herein has been designated as ten inches. The bar 63 is rotated by the mechanism illustrated in FIGS. 16 and 17. A ram 89 operates a rack 91 to rotate a pinion 92 and revolve a sector 93 secured by keys 94 within slots 95 in the advancing bar 63. The slots permit the bar 63 to be moved longitudinally relative to the sector 93 while maintaining a rotary drive relation therewith. The sector rotates the bar 63 through 90° to move the pins 81 to a horizontal or a vertical position out of or into position of engagement with the pallets 48. The bar rotating mechanism is positioned between a pair of bridging members 21 on a plate 27, being located thereon by dowels 28 and secured thereto by screws 29. The casting 96 of the device has an arcuate projection 97 machined thereon centrally of the axis of the advancing bar 63 and above an aperture 98 for an end of a stub shaft 99 of the pinion 92. A plate 101 has a mating arcuate projection 102 to that on the casting 96 and an aperture 103 for the other end of the stub shaft 99 of the pinion 92. A plurality of bolts 104 secures the plate to the casting, with the arcuate projecting portions 96 and 102 extending into arcuate recesses 105 in the sector 93 to accurately locate the sector in the fixture. As illustrated in FIG. 16, the rack 91 has a rod 106 secured in extension thereof containing adjustable nuts 107 for actuating the arms 75 of switches or other servo-devices 76.

As pointed out hereinabove, the pallets 48 ride upon the shoulders 87 of the pallet locating and clamping mechanisms 33 as they are advanced to work-operating positions. At each mechanism a pair of pistons 108 and 109 are operated for raising and positioning the pallet in accurately located relation to the work performing devices. The operation of the piston 108 moves a plunger 111 upwardly to have a sloping surface 112 at the upper end enter a slot 113 in the side edge of the pallet 48 to raise the pallet and to locate the pallet by having a positioning block 114 engage a positioning block 115 at one side of the slot 113. This operation accurately locates the pallet longitudinally of the machine at each of the locating and clamping mechanisms 33. Each of the mechanisms has locating bars secured above the shoulder portions 87 which are relieved along the inner edges to provide locating faces 117 at each end which engage the four top corners of a pallet.

The piston 109 moves a plunger 118 upwardly to have its sloping surface 112 engage a sloping surface 119 on the opposite side of the pallet 48 from that having the slot 113 therein. The plunger 118 shifts the pallet 48 to the right against a pair of locating buttons 120 and assists the plunger 111 to raise the pallet into engagement with the four faces 117. The operation of the plungers 111 and 118 accurately positions the pallet sidewardly and longitudinally before it is clamped against the four locating faces 117 and accurately positions the workpiece relative to the work-performing devices. As pointed out hereinabove, the top side edges of the pallets are cleaned before entering the locating and clamping mechanisms 33 by the wiper elements 35 and the fluid delivered through the conduits 36.

Figure 20:
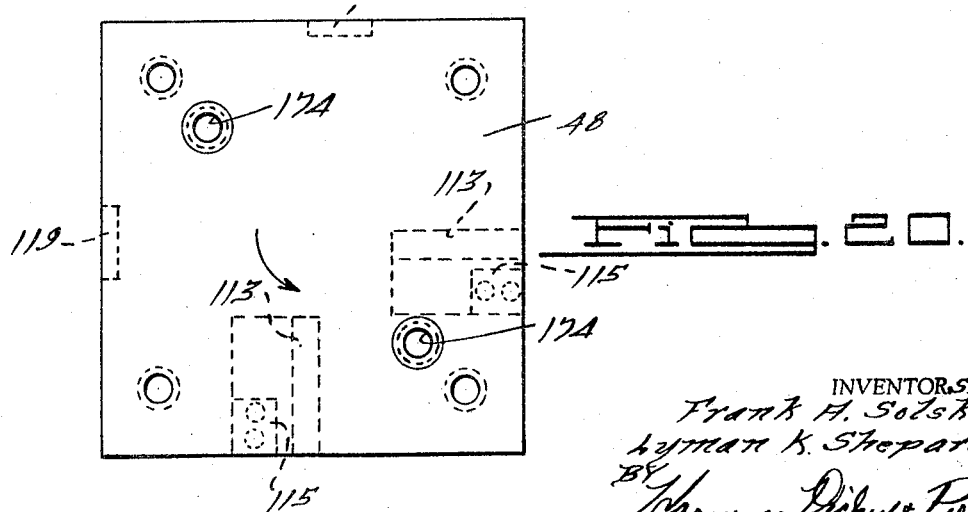
FIG. 20 is a plan view of a pallet which is employed in the machine of the present invention.

The air passageways 84 in the locating and clamping mechanisms 33 are joined by passageways 121 to passageways 122 in the locating bars 116 which communicate with passageways 123 having outlet ends through the locating faces 117. Air is also delivered from passageways 124 having outlet ends through the locating buttons 120. When the pallet 48 is accurately positioned, air is cut off through the outlet passageways 123 and 124 and pressure builds up in the passageways 84 and in the conduit 125 leading thereto to sense the fact that the pallet is accurately located. Fluid is admitted through the passageway 126 to the right-hand end of the piston 108 to advance it to the left, as illustrated in FIG. 13, and to clamp the plunger 111 in raised position. Because of this clamping action, a greater pressure is required to shift the piston to the right, and to this end a piston 127 of larger diameter is urged by a fluid from the passageway 128 for producing a substantially greater force on the right-hand end to unlock the plunger 111 and shift the piston 108 to its initial position. The piston 109 does not lock the plunger 118 in raised position and the force for returning the piston to initial position is substantially the same as that for advancing the piston. The pallet is square and lends itself for rotation through 90° to present different portions of the workpiece to the work-performing devices. As illustrated in FIG. 20, the slots 113 and the sloping surfaces 119 are provided in the other two adjacent faces of the pallet so that after the pallet is turned 90° the plungers 111 and 118 may be employed for raising and accurately locating the pallet within the next adjacent clamping mechanism 33.

In FIGS. 18 to 22, a turning device 129 is illustrated for rotating a pallet 90° in its path of advancement through the machine. The turning device is mounted on a plate 27 between two of the bridge elements 21 at any place along the machine where it is desired to present a different face of the workpiece to the work-performing devices. The turning device is secured to the plate 27 and has a base casting 131 having spaced side portions 132 containing end posts 133 which support rail members 134 which are secured thereto. A square plate 135 has a cylindrical recess 136 and spaced bars 137 positioned thereon by dowels and secured thereto by screws at the corners of the plate. The plate 135 rests upon four pins 138 when in lowered position, in which position the top of the bars 137 is below the top of the rail members 134, thereby forming a shoulder for guiding the pallet when advanced thereon or moved therefrom. The outside face of the bars 137 has a shoulder thereon which limits their upward movement and prevents any tilting longitudinally of their length. When in raised position, the top of the bars 137 extends slightly above the rail members 134 so that when a pallet rests thereon it will be out of engagement with the members.

The casting 131 has a cylinder 141 therein in which a piston 142 is movable lengthwise thereof by fluid admitted through the passageways 143 and 144. The passageways are in communication with the passageways 126, 128, respectively, of the pallet locating and clamping mechanisms 33 so as to operate in timed relation therewith. The piston 142 moves a plunger 145 vertically when moved to the right, as viewed in FIG. 19. The plunger has a stem 146 thereon about which a spool 147 is rotatably secured by a screw 148. The spool rotates on a thrust washer 149 and is secured on its upper edge to a disk 151 which has a flange 152 engageable with a flange 153 extending inwardly within the cylindrical recess 136 of the disk. When the piston 142 is actuated to the right, the plunger 145 is moved upwardly to have the disk move upwardly until the flange 152 thereof strikes the plate 135 and raises the plate and bars 137 along therewith to the uppermost position where the top edges of the bars are above the rail members 134. The top of the disc 151 has a pair of posts 154 extending upwardly therefrom and located 180° apart, the posts having a projecting end 155 at the top thereof. A pair of locking pins 157 and 158 extend downwardly from the disk and an actuating pin 159 extends upwardly from an aperture 161 therein. A similar aperture 162 is provided in the disk 180° from the aperture 161 to permit the pin 159 to be supported therein to produce reverse movement of the disk 151.

Figure 18:
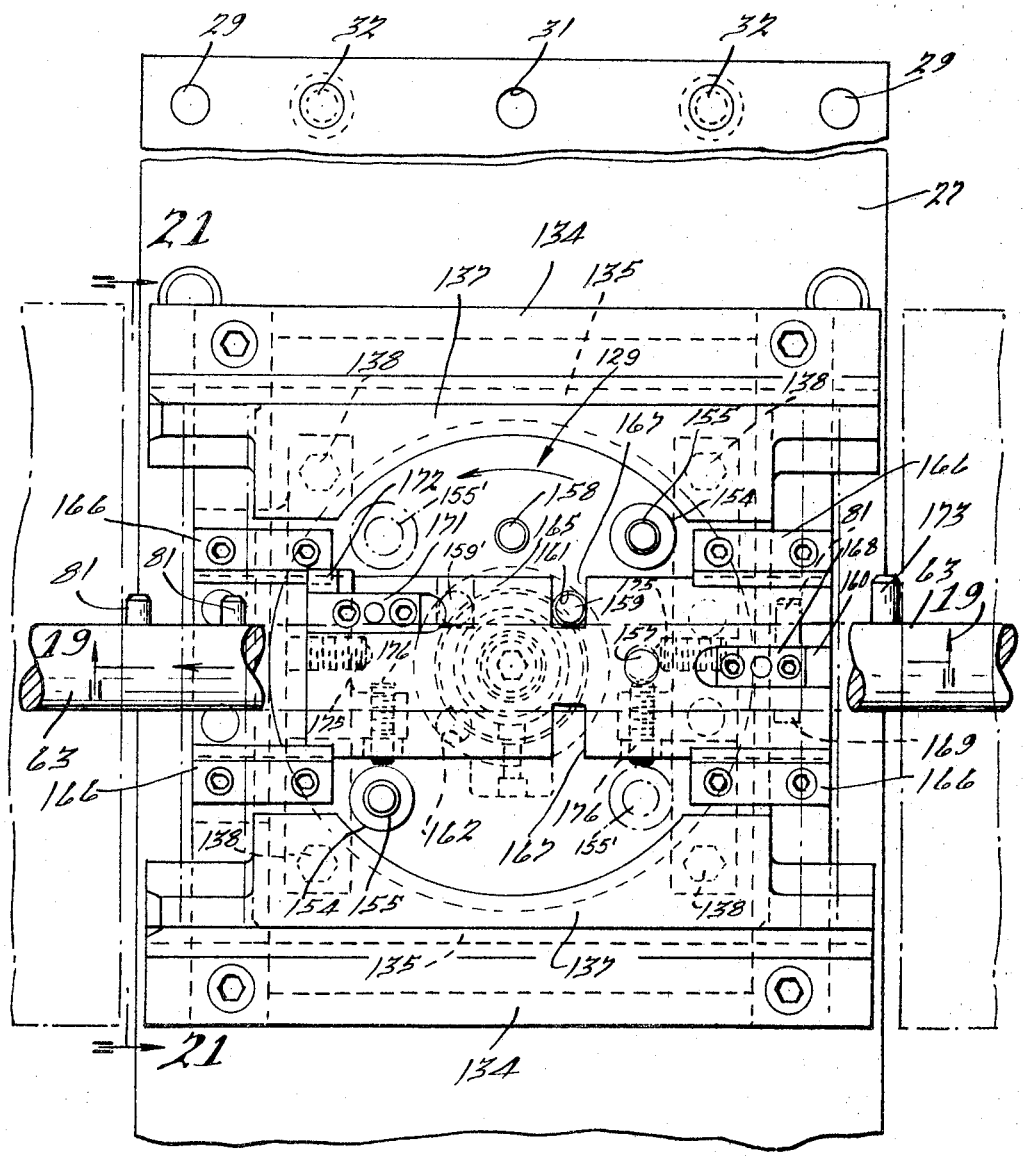
FIG. 18 is a plan view of a rotating mechanism for turning the pallets through 90°.
Figure 19:
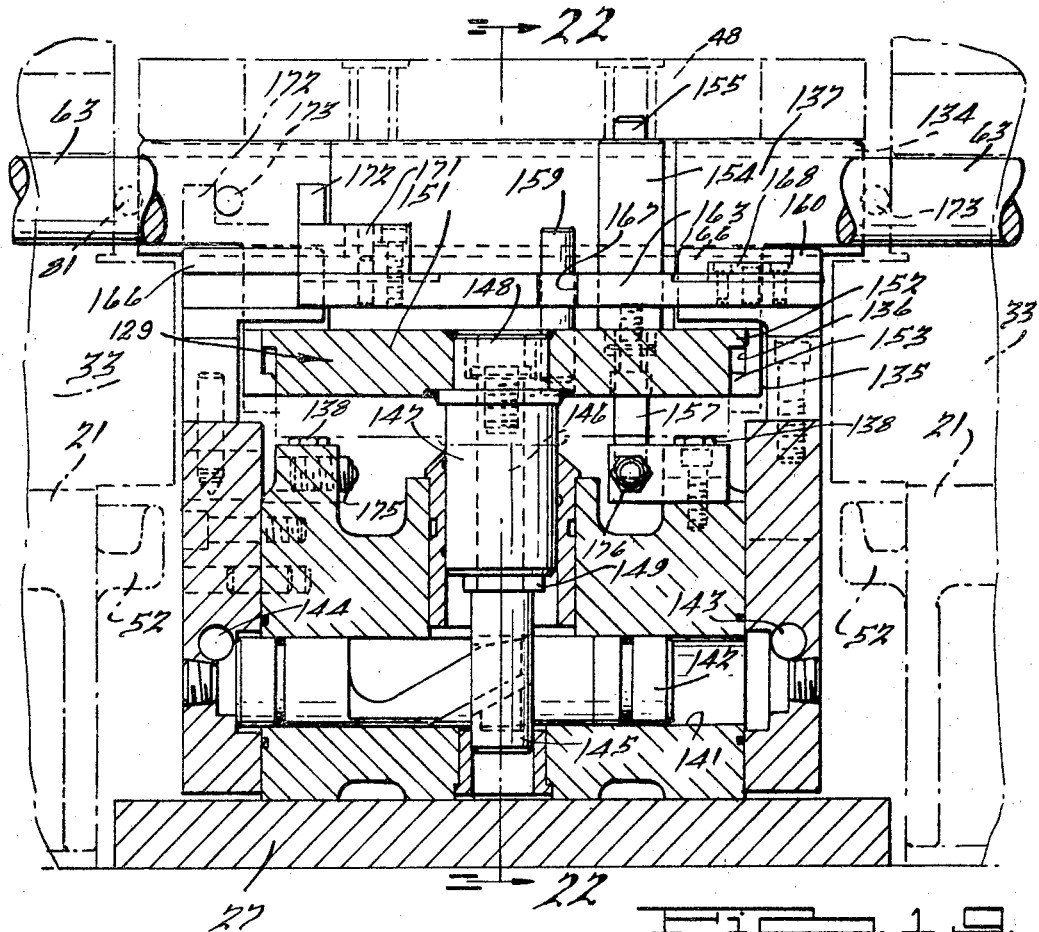
FIG. 19 is a sectional view of the structure illustrated in FIG. 18, taken on the line 19—19 thereof.

Between the upstanding posts 133 of the casting, a U-shaped element 150 is located which may be a part of the casting or which may be secured thereto by dowels and screws in the conventional manner. Each side edge of the elements 150 have a pair of upwardly extending posts 163 at diametrically opposite sides of the disc 151 below the bar 63. The posts have facing shoulder portions 164 for receiving a slide 165. Retainer elements 166 on the posts 163 extend over the slide and secure it in sliding position upon the shoulders. The slide 165 has a pair of slots 167 in one of which the pin 159 is located, depending on whether it is disposed in the aperture 161 or 162. A stop block 168 is located at the right-hand side of the slide 165, as viewed in FIG. 18, having a finger 160 engageable by an extruding end 169 of an adjacent pin 81 of the advancing bar 63 when the pins 81 thereof are disposed in vertical position. A second block 171 is mounted along one edge of the slide at the left-hand end, having an upstanding finger 172 projecting outwardly sufficiently to have the pins 81 pass thereby when the pins 81 are in horizontal position. An adjacent pin 81 is of greater length, being indicated by numeral 173 which, when in horizontal position and moved to the left, will strike the finger 172 and return the slide 165 to its initial position, with the pin 173 in position to engage the edge of the pallet when the pins are moved to vertical position. It is to be understood that when the end 169 of the pin 81 engages the block 168 the rod 63 has been rotated to have the pins 81 and 173 disposed in vertical position to advance the pallets from one station to the next. This occurs in the down position of the disk 151 and posts 154 which is rotated to its initial position without rotating the pallet. When the advancing rod 63 is retracted with the pins 81 in horizontal position, a pallet will be raised on the bars 137 above the rail 134 by the upward movement of the spool 147 and the posts 154. The engagement of the finger 172 and its advancement to the left by the pin 173 will rotate the disk 151 in the counterclockwise direction of the arrow as the pin 159 moves from the position illustrated in solid line in FIG. 18 to the position 159' shown in dotted lines. This will be an exact 90° movement and the pallet will be rotated 90° with the posts 154 which are located on opposite sides of the bar 63. The posts move on a 90° arc from the solid line position 155 to the dotted line position 155', as illustrated in FIG. 18 without interfering with the bar 63. The pallet as illustrated in FIG. 20 has a pair of bosses 174 containing apertures in which the projecting end 155 of the posts 154 enters when the disk and posts are in raised position. The pallet is prevented from tilting by the upper edges of the bars 137 which have been raised substantially to the height of the posts. The projecting ends 155 firmly support the pallet and produce its rotation through 90° as the slide is moved to the left through the engagement of the pin 173 with the finger 172.

It is understood that the turning device 129 can rotate the pallet 90° either in a clockwise or counterclockwise direction and that any number of turning devices may be employed located between a pair of bridging members 21 at any point on the machine. The pallet can be progressively turned through 360° or can be turned to 90° and returned to its initial position by the use of a second turning device having its pin 159 located in the aperture 162. Since any number of the devices may be employed to turn in either direction, the pallet may be turned to any 90° increment and returned to its original position through the use of a plurality of turning devices. On the center line of the casting 131, threaded sleeves 175, having a spring-pressed ball therein, are supported in facing relation. Stop screws 176 are located adjacent to the balls for stopping the locking pins 157 and 158 and have them engaged by the ball with the threaded sleeves 175 in either 90° position. After a pallet has been delivered to the turning device 129, the piston 142 is actuated to the left, the same as pistons 108 and 109 of the pallet locking and clamping mechanism 33, positioning and clamping the pallets and raising the disk 151. The reverse movement of the advancing rod 63 takes place with the pins 81 and 173 in horizontal position. During this movement, the pin 173 will strike the finger 172 and rotate the disk 151 and the pallet supported on the posts 154 thereof, with the projecting ends 155 engaged within the bushings 174 of the pallet. In this position, the pin 158 will engage the stop 176 and pass the spring pressed ball of the threaded sleeve 175 which will retain the disk in rotated position. When the pallet in the locating and clamping mechanism 33 is released, the piston 142 is moved to the right, lowering the disk 151 and the bars 137 in position to receive a pallet which will be advanced thereon by the vertically disposed fingers 81 and 173 when the advancing rod 63 is advanced. The end 169 of a pin 81 will extend downwardly in a position to contact the finger 160 of the block 168 to thereby return the slide to the position illustrated and advance the pin 159 to thereby rotate the disk 151 in a reverse direction to the position illustrated. The disk 151 will be locked in the new position by the engagement of the pin 157 with the ball of the sleeve 175 and with the stop screw 176, as illustrated in FIG. 18. An air passageway 177 is connected to a supply passageway and to an outlet passageway 178 on each of the bars 137. The air being exhausted from the outlet passageway 178 is sealed off when the disk 151 is in raised position to provide an indication that the raising operation has been completed.

After a pallet has been advanced through all of the stations and reaches the discharge end 38 of the machine, the finished workpiece is removed from the fixture and a new workpiece to be machined is placed therein. In the next advancement of the pallets, the pallet with the new workpiece will be moved into the lowering elevator 39 illustrated in FIGS. 23, 24, 25 and 26. Each elevator 39 and 41 is mounted on a base structure 181 which is tied to the rails 19 by dowels and bolts 180. The elevators are also secured to the base member 10 by bolts 182 having a spacer 183 thereon.

In the lowering elevator 39, a pallet receiving structure 184 supports slide plates 185 and 186 having spaced L-shaped fingers 187 onto which a pallet is advanced by the pins 81 as the advancing rod moves all of the pallets in the series toward the finished end of the machine. An elevator plate 188 is supported on a bearinged sleeve 189 on a pair of spaced rods 191 for upward and downward movement thereon. The plate 188 is U-shaped, having oppositely disposed sections 192 joined by a bridging member 193. The sections 192 have spaced fingers 194 thereon disposed between the supporting fingers 187 on the slide plates 185 and 186. The sleeves 189 are bridged by a nut 195 between the rods 191 which is threaded onto a drive screw 196 which is driven by a motor 197 which is herein illustrated as being of the fluid type. The bridge between the sleeves 189 carries a cam 198 which, when moved upwardly and downwardly past a roller 199 on a lever 201, rocks the lever on a pivot 202 carried by a bracket 203 secured to the structure 184. When the roller 199 is cammed outwardly, the upper bifurcated end 204 of the lever 201 moves inwardly. A pin 205 in the slide plate 186 extends through a slot in the upper end of the lever 201 which moves the plate inwardly toward the plate 185. The plate 185 is moved inwardly by a link 206 connected to the lever 201 and to one end of a link 207 which is pivoted at 208 and connected to the plate 185 by a pin 209.

A rod 211 is urged downwardly by a spring 212 along with a plunger 213 which mates with a slot 214 in the plates 185 and 186 and retains the plates in forward position against the pressure of the springs 215 which urge the plates 185 and 186 away from each other. The locking of the plates in this manner retains the fingers 187 in pallet receiving position and permits the elevator plate 188 to move upwardly to receive a pallet. Near the end of the movement, the plunger 213 releases the plate 186 which retracts with the plate 185, withdrawing the fingers 187 with the pallet resting on the fingers 194 of the elevator plate 188.

A switch operating plate 216 opens the contacts of the switches 217 and 218 upon the initial downward movement of the elevator plate. Thereafter, the cam 198 engages the roller 199 and moves the plates 185 and 186 to forward latched position. Thereafter, the switch operating plate 216 actuates a switch 219 which provides an indication that the elevator plate 188 has moved downwardly and that the plates 185 and 186 have moved inwardly. This permits the advancing bar 63 to move a pallet 48 into receiving position on the fingers 187. A stop element 221 on the innermost finger 187 limits the movement of the pallet, and a dog 222 engages the rear edge of the pallet and retains it in locked position on the fingers 187. The continued downward movement of the elevator plate 188 causes the switch operating plate 216 to actuate a switch 223 at the time the pallet is deposited upon a transfer belt 224. The switch 223 operates a timer relay which provides sufficient time for the pallet to be advanced by the belt 224 off the fingers 194 and away from the elevator plate 188 before it operates a reversing switch which reverses the direction of rotation of the drive screw 196 and causes the elevator plate to move upwardly. The upward movement will continue until the plate 216 operates the switch 218 to interrupt the drive of the screw 196 and stop the plate 188 in the position illustrated, below the pallet receiving position of the fingers 194. After the advancing bar 63 has been retracted after moving a pallet onto the fingers 187 at the end of the stroke, a switch is operated to energize a circuit which bridges the circuit interrupted by the switch 218 to start the operation of the screw 196 which completes the upward movement of the elevator plate 188. At the same time, an operating finger 225 carried by the nut engages a boss 226 on the end of the rod 211 to raise the rod and move the plunger 213 out of the slot 214 to permit the springs 215 to retract the plates 185 and 186, moving the fingers 187 out of engagement with the pallet 48. The switch 217 is actuated at the end of the upward movement of the pallet to produce the reversing of the drive screw 196 and the lowering of the elevator plate 188 to again lower a pallet onto the belt and complete the cycle just described.

A switch 227 is employed on the machine to stop the downward movement of the elevator plate should the workpiece become unclamped in the fixture. For this purpose, a rocking bar 228 is mounted on a pivot 229 in position to have its end 231 located in the path of movement of the unlocked hand 62 of the fixture when being moved downwardly with the pallet 48. A downwardly extending arm 232 is urged against a stop 233 by the action of a spring 234. When the end 231 is moved downwardly by the locking handle 62, the arm 232 is moved away from the stop into engagement with the operating arm 235 of the safety switch 227 which, when actuated, interrupts the driving of a lead screw 196 to stop the lowering movement.

Referring to FIGS. 27 to 31, the lifting elevator 41 is illustrated for raising the pallets and fixtures with a new workpiece therein from the transfer belt to the rails at the forward end of the machine. The mechanism is similar to that above described in FIGS. 23 to 26 inclusive for lowering the pallet except for the retracting plates 236 and 237 which are spring-pressed inwardly by a spring 238. In this arrangement, the lever 201' has the roller 199' on the outer edge to be operated by an extension arm 245 on the nut 195' when passing thereover in the upward movement of the elevator plate 239 which is substantially the same as the plate 188 of the lowering mechanism. An adjustable switch operating plate 241 is carried by the nut for operating a switch 242 when the elevator plate 239 is in raised position for stopping the upward movement thereof. A switch 243 at the bottom of the mechanism is operated by the plate 241 for stopping the downward movement of the elevator plate 239. Inward movement of the roller 199' during the upward movement of the elevator plate moves the lower end of the lever 201' to the left, actuating the link 206' to the right and rocking the link 207' about the pivot 208' to move the retractable plate 237 to the left. The upper end of the lever 201' moves the retractable plate 236 to the right, as illustrated in FIG. 27. The outward movement of the plates 236 and 237 moves the fingers 187' of the plates out of a position of engagement with the pallet 48. A pawl 244 is carried on the extending arm 245 of the nut in alignment with the roller 199' secured thereon by a pivot 246. The pawl will be rotated in a clockwise direction when passing over the roller 199' during the downward movement of the nut. The continued downward movement will cause the pawl to strike a block 247 and be rotated counterclockwise to the position illustrated in the figure. Upon the upward movement of the nut, the sloping surface 248 of the pawl will engage the roller and operate the lever 201' to the left, as above described.

A rod 249 is mounted in a bearing 251 in the upper portion in the plate supporting structure 252 of the elevator mechanism. The upper end of the rod has a plunger 253 thereon which is urged downwardly by springs 254 about the lower end of the rod 249, being retained thereon by a head 255. In raised position the arm 245 engages the head 255 and moves the plunger 253 into the position illustrated in FIG. 31 above the top surface of the plate 236. Upon downward movement of the nut, the head 255 is released to permit the spring to urge the plunger 253 downwardly against the surface of the plate 236. An arcuate notch 256 is provided in the retractable plate 236 into which the plunger 253 is urged by the spring after the plate is retracted by the movement of the lever 201'. This retains the plates 236 and 237 in retracted position and the supporting fingers 187' thereof out of the vertical path of the pallet 48 which may then pass upwardly between the fingers. As pointed out above, when the elevator plate has moved a pallet upwardly to raised position, the head 255 of the rod 249 is struck by the arm 245 to raise the plunger 253 from the notch 256 to permit the springs 238 to move the plates 236 and 237 toward each other and the fingers 187' into a position to receive the pallet. The fingers 187' support the pallet as the elevator plate 239 is moved downwardly to a position to receive another pallet from the belt.

The conveyor belt 224 is mounted on a roller 257 on the lifting elevator 41 and a roller 258 on the lowering elevator 39. The rollers are mounted on pillow blocks 259, those illustrated in FIG. 23 being mounted on a shiftable platform 261 in position to be adjusted by a pair of screws 262 supported on a bracket 263. Clamping bolts 264 lock the platform 261 in adjusted position, aided by the screws 262. The roller 257 is supported on a shaft 265 driven by a variable speed motor 266 in the usual manner. The under side of the belt is supported by the web 268 of a channel element 267. The web 268 extends forwardly, as illustrated in FIG. 28, with its ends spaced a slight distance from the roller 257. The channel element 267 is supported by angle members 269 on the side plates of the bases 10 of the machine at spaced intervals therealong. The channel elements 267 are in sections the length of the base sections where they are joined together. The members 269 also support angle members 271 which extend downwardly to support a shaft 272 of a roller 273 which engages the under surface of the lower portion of the belt. The side flanges 274 of the channel element 267 act as guides for maintaining the pallets in aligned relation as they are advanced by the belt, which rests upon the top surface of the web 268, as the belt is continuously driven. As the pallets advance to the lifting elevator 41, they are stopped by a bar 275 which is rocked on a pivot 276 by a spring 277 limited by an adjustable screw 278. A finger 279 on the forward end of the bar is struck by the lowering elevator plate 239 and rocks the bar 275 downwardly to the position illustrated in dotted line in FIG. 27. In this position, the pallet is permitted to advance from the belt onto the fingers 194' of the plate 239 where it is stopped by the pins 270 mounted thereon. The next adjacent pallet will advance with the belt until it engages the knife edge 280 of the stop members 271 which was moved upwardly into the path thereof. The upward movement of the plate 239 carries the pallet to a position above the fingers 187'. The upward movement raises the plunger 253 from the recess 256 to permit the plates 236 and 237 to move toward each other and move the fingers 187' beneath the pallet.

When the pallets are lowered onto the belt, they are advanced forwardly thereby at a constant speed equal to or greater than the driven speed of the pallets. When the forward pallet strikes the bar 275, the belt will continue to advance while the foremost pallet and those engaged therewith and with each other are retained stationary. As the pallet enters the conveyor, a pivoted lever 281 operates a switch 282 which actuates a timer relay and senses an interval greater than that required for the plate 239 to move downwardly, engage a pallet and raise it to its uppermost position. The relay senses whether or not the operation is defective and will shut off the motor 266 and stop the belt if too much time elapses before another pallet is advanced by the belt past the lever 281.

As more clearly disclosed in FIG. 27, a link 287 is secured by a pivot 288 to have one end 289 disposed in the path of movement of the pallets 48. The opposite end 291 of the lever 287 is disposed in a position to engage the operating arm of a switch 292 for the purpose of indicating that a pallet is in position to be raised by the lifting mechanism 41 and thereupon energizes the fluid system which actuates the driving motor 197' of the screw 196'.

The operation of the machine

The workpieces are placed in the fixtures at both ends of the machine until the pallet having a finished workpiece reaches the unloading and loading station at the rear end of the machine. At that time all of the fixtures of the pallets will have a workpiece secured therein. Thereafter, only the unloading and loading station at the rear end of the machine will be manned. When the advanceable bar 63 is moved to the right, that is, from the front toward the rear of the machine, all of the pallets will be advanced an interval which, for the example herein illustrated, will be ten inches. The pallets at the locating and clamping stations 33 will be accurately located and clamped in accurate position indicated by the cutting off of the air supply to the clamping corners of the fixtures. This will also be true of the air at the stations at which the pallets are rotated 90° so that a sensing will be had that all of the pallets are in proper position. The increase of pressure in the air system will operate a servomechanism for energizing the work performing devices at all of the stations. The device will be advanced to have the workpieces engaged by the tools which are rotated and further advanced to perform the machine operation.

The advanceable bar 63 will be rotated 90° to have the pins 81 move to horizontal position and the bar will be retracted to its initial position. After the completion of the machine operation, the tools will be withdrawn and the work performing devices will be returned to their initial positions. Thereupon, the advanceable bar 63 is rotated 90° in a reverse direction, moving the pins 81 to the vertical plane in position to engage and advance the pallets the next adjacent interval into the work performing and rotating stations and those therebetween. Each advancement of the advanceable bar 63 will move the endmost pallet, which has had the finished workpiece removed and a new workpiece to be machined clamped therein, into the lowering device 39 which will be operated to lower the pallet onto the conveyor belt 224. During this operation, the foremost pallet on the belt will be raised by the lifting mechanism 41 and the retracted slide 237 will be locked out to retain the fingers 187 on both slides in retracted position. The lifting mechanism will be stopped upon the operation of the switch 218 and the motor 179 will be again energized when the advanceable bar 63 has been retracted. This will raise the pallet above the fingers 194 and the rod 211 will be moved upwardly to move the plunger 213 from the aperture 214 and permit the slides to advance toward each other, with the fingers 187' disposed in position to receive the pallet when the lifting mechanism 193' is again lowered. Upon the retraction of the advanceable bar 63, with the pins 81 in horizontal position, the bar will move beneath the pallet. When the bar 63 is rotated 90° to have the pins 81 disposed in vertical position, the bar is advanced and the pallet will be moved from the lifting device 39 onto the rails 134 of the locating and clamping mechanism 33 disposed adjacent thereto. This sequence of operation will continue, and after each advancement of the bar 63 a finished workpiece will be unloaded from a fixture at the unloading and loading station and a new workpiece will be placed therein. At the same time, a pallet will be lowered by the lowering mechanism 41 onto the conveyor belt 224 while the most advanced pallet thereon will be deposited in the lifting mechanism 39 which will be completely raised when the bar 63 is in advanced position so that the pallet will be positioned above the fingers 187 which will move thereunder when the slides 185 and 186 are released by the plunger 213.

A motor driven pump 295 supplies hydraulic fluid necessary for operating the rams and motors 179 of the machine. A motor driven pump 296 supplies air for the air-sensing system. The hydraulic fluid system is controlled by electrically operated hydraulic valves in a panel 297 from the various switches on the machine and the electric circuits of a panel 298 which is also controlled from the air-responsive system in a panel 299. A pump 300 delivers the coolant from the tank 26 to the various tools as required. The specific circuits for the electric, hydraulic and air systems are not herein illustrated in detail as such circuits are well within the knowledge of one skilled in the art.

What is claimed is:

1. In a machine, a base structure made of a plurality of like sections having a cooling trough thereon, a plurality of bridge members disposed transversely of said structure and spaced the same predetermined interval apart, trough means about the edge of said bridge members having discharge ends located above said base structure trough, a series of pallets, rail members on said bridging members disposed parallel to said base structure for supporting said pallets at said intervals, means for simultaneously advancing said pallets to said intervals, means independent of said advancing means for locating and clamping said pallets after each advancement, and means on at least some of said bridge members for performing a machining operation on a workpiece supported by said pallets.

2. In a machine, a base structure, a plurality of bridge members disposed transversely of said structure and spaced a predetermined interval apart, a series of pallets, means for supporting said pallets at said intervals, means for simultaneously advancing said pallets to said intervals, means on said bridge members for performing a machining operation on a workpiece supported by said pallets, a conveyor system in said base structure for advancing the pallets from the rear to the forward end thereof, elevator means at the forward and rearward ends of the base structure for raising and lowering the pallets, respectively, trough means carried by said base structure above said conveyor system, and troughs about the end edges of said bridge members which are spaced in the center above the trough means for collecting fluid delivered thereto and direct it to said trough means.

3. In a machine for advancing pallets having a fixture thereon for a workpiece seriatim from one station to another where work is to be performed thereon, an advancing bar below the pallets having spaced aligned fingers thereon which engage substantially the center of the pallets when in vertical position, means for advancing the bar and pallets, means for accurately locating said pallets at said stations independently of said fingers, means for rotating said bar to have the fingers disposed in substantially horizontal position, and means thereafter for reversing said advancing means for retracting said bar.

4. In a machine for advancing pallets having a fixture thereon for a workpiece seriatim from one station to another where work is to be performed thereon, track means on which said pallets are advanced, an advancing bar having spaced aligned fingers thereon which engage the pallets when in vertical position, means for advancing the bar and pallets, means for rotating said bar to have the fingers disposed in substantially horizontal position, means thereafter for reversing said advancing means for retracting said bar, means independent of said fingers at the work performing stations for raising said pallet and shifting it laterally and longitudinally to accurately locate the pallet and for clamping the pallet in raised position when accurately located, a turning mechanism at one of said stations for raising the pallet above the track means, and means on said advancing bar for rotating the pallet through 90° when raised above said track means.

5. A pallet made from a flat plate of square configuration having means thereon by which it is shifted along two adjoining edges for accurately locating the pallet at a station, and similar means provided on the plate 90° from said first means for similarly shifting the plate when the plate has been rotated 90° in the plane thereof.

6. A pallet made from a flat plate of square configuration having means thereon by which it is shifted along two adjoining edges for accurately locating the pallet at a station, similar means provided on the pallet 90° from said first means for similarly shifting the pallet when the pallet has been rotated 90° in the plane of the plate, and means on said pallet engageable by rotating means when the pallet is to be rotated.

7. In an elongated machine made up a plurality of sections, each section embodying a base, bridge members transversely disposed across said base and accurately spaced apart when said base sections are secured together to provide accurate increments for the advancement of a workpiece, pallets having fixtures thereon for supporting a workpiece, track means on said bridge members parallel to said base on which the pallets are advanced from one to the other end thereof, an advanceable bar substantially the length of the machine having fingers thereon in plane which may be disposed vertically or horizontally for engaging and advancing the pallets simultaneously when the fingers are in the vertical plane and which are disengaged from the pallet when in a horizontal plane permitting the bar to be retracted, means for advancing and retracting said bar, a turning mechanism on said machine in the path of movement of said pallets, raisable means in said turning mechanism for engaging said pallet and lifting it above the track means, and means operated by said advanceable bar for rotating said raisable means through 90°.

8. In an elongated machine made up of a plurality of sections, each section embodying a base, bridge members transversely disposed across said base and accurately spaced apart when said base sections are secured together to provide accurate increments for the advancement of a workpiece, pallets having fixtures thereon for supporting a workpiece, track means on said machine on which the pallets are advanced from one to the other end thereof, an advanceable bar substantially the length of the machine having fingers thereon in a plane which may be disposed vertically or horizontally for engaging and advancing the pallets simultaneously when the fingers are in the vertical plane and which are disengaged from the pallet when in a horizontal plane permitting the bar to be retracted, means for advancing and retracting said bar, a turning mechanism on said machine in the path of movement of said pallets, raisable means in said turing mechanism for engaging said pallet and lifting it above the track means, means for rotating said raisable means through 90°, said rotating means comprising a slide having means for rotating the raisable means when moved in one direction, an extending finger on said bar which engages said slide to move the slide a predetermined distance when the bar is longitudinally moved in one direction, and a finger on said bar engageable with the slide for returning it to its initial position when the bar is moved in the other direction.

9. In a machine, a rectangular base made of a plurality of like sections, a trough in the upper central portion of each said section, bridge members transversely disposed on said base and located a predetermined interval apart above said base section trough, and troughs about the ends of said bridge members the delivery ends of which extend above the base trough sections from which a fluid delivered to the bridge members will be directed into said base trough sections.

10. In a machine for advancing pallets having a fixture thereon for a workpiece seriatim from one station to another where work is to be performed thereon, track means on which said pallets are advanced, an advancing bar having spaced aligned fingers thereon which engage the pallets when in vertical position, means for advancing the bar and pallets, means for rotating said bar to have the finger disposed in substantially horizontal position, means thereafter for reversing said advancing means for retracting said bar, means independent of said fingers at the work performing stations for raising said pallet and shifting it laterally and longitudinally to accurately locate the pallet and for clamping the pallet in raised position when accurately located, a turning mechanism at one of said stations for raising the pallet above the track means, and means for rotating the pallet through 90° when raised above said track means.

References Cited by the Examiner

UNITED STATES PATENTS

| | | | |
|---|---|---|---|
| 1,939,038 | 12/1933 | Bower | 29—38.3 |
| 2,028,008 | 1/1936 | Peyinghaus | 29—33.12 |
| 2,103,147 | 12/1937 | Cole | 29—33.12 |
| 2,139,403 | 12/1938 | Cole | 29—33.12 |
| 2,371,906 | 3/1945 | Millholland | 29—33.12 |
| 2,392,169 | 1/1946 | Mansfield | 29—33.12 |
| 2,413,016 | 12/1946 | Wiken et al. | 29—972 |
| 2,501,738 | 3/1950 | Prutton | 29—972 X |
| 2,507,437 | 5/1950 | Eserkaln | 29—972 X |
| 2,517,505 | 8/1950 | Pegard | 82—32 |
| 2,625,061 | 1/1953 | Mansfield | 77—32 |
| 3,108,676 | 10/1963 | Rommel | 198—19 |

RICHARD H. EANES, JR., *Primary Examiner.*